US011366508B1

(12) United States Patent
Kakkireni et al.

(10) Patent No.: US 11,366,508 B1
(45) Date of Patent: Jun. 21, 2022

(54) EXTENDED CURRENT LIMIT MESSAGE LATENCY AWARE PERFORMANCE MITIGATION

(71) Applicant: QUALCOMM Incorporated, San Diego, CA (US)

(72) Inventors: Prashanth Kumar Kakkireni, Hyderabad (IN); Naveen Kumar Narala, Bengaluru (IN); Sharon Graif, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/180,071

(22) Filed: Feb. 19, 2021

(51) Int. Cl.
*G06F 1/3234* (2019.01)
*G06F 13/42* (2006.01)
*G06F 1/12* (2006.01)
*G06F 1/3206* (2019.01)
*G06F 1/26* (2006.01)

(52) U.S. Cl.
CPC .............. *G06F 1/3234* (2013.01); *G06F 1/12* (2013.01); *G06F 1/26* (2013.01); *G06F 1/3206* (2013.01); *G06F 13/4282* (2013.01)

(58) Field of Classification Search
CPC ...... G06F 1/3234; G06F 1/12; G06F 13/4282; G06F 1/26; G06F 1/3206; H02H 9/02; H02J 7/00304
See application file for complete search history.

(56) References Cited

U.S. PATENT DOCUMENTS

| 10,255,231 | B1* | 4/2019 | Briggs | G06F 1/3206 |
|---|---|---|---|---|
| 2015/0268678 | A1* | 9/2015 | Yu | G05F 1/46 |
| | | | | 327/540 |
| 2017/0063141 | A1* | 3/2017 | Kim | H02J 7/025 |
| 2017/0070071 | A1* | 3/2017 | Han | G06F 1/3296 |
| 2017/0153680 | A1* | 6/2017 | Girard | G06F 13/362 |
| 2018/0316223 | A1* | 11/2018 | Wingrove | H02J 13/00002 |
| 2020/0153230 | A1* | 5/2020 | Atluri | H02H 3/093 |
| 2020/0335961 | A1* | 10/2020 | Huang | H02H 9/004 |
| 2021/0294369 | A1* | 9/2021 | Koski | G05F 1/5735 |

* cited by examiner

*Primary Examiner* — Glenn A. Auve
(74) *Attorney, Agent, or Firm* — Qualcomm Incorporated

(57) ABSTRACT

Systems, methods, and apparatus for power management are disclosed. A power management integrated circuit has a bus interface circuit configured to couple the power management integrated circuit to a shared communication bus, one or more regulator circuits configured to provide current to a managed device, and a controller. The controller is configured to determine that current consumption by the managed device exceeds a threshold level, generate an extended current level message to be transmitted over the shared communication bus to the managed device and transmit a time value with the extended current level message, the time value indicative of an elapsed time between generation of the extended current level message and start of transmission of the extended current level message.

30 Claims, 15 Drawing Sheets

EXTENDED CURRENT LIMIT MESSAGE LATENCY AWARE PERFORMANCE MITIGATION

TECHNICAL FIELD

The present disclosure relates generally to communication over a shared bus and, more particularly, to the use of a shared bus to include latency information in messages communicated from a power management integrated circuit.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband and application processors and peripheral components. In some implementations, systems employ SPMI to support power management operations within a device.

In many instances, a multi-drop serial bus may be provided to support a combination of high-priority, low-latency communication and lower-priority communication. Latency can be adversely affected when multiple devices coupled to the serial bus are concurrently active and attempting to gain bus access for transmission initiation. Degraded latencies can lead to a failure to meet certain applications performance limits. As mobile communication devices employ increasing numbers of radios and continue to provide greater levels of functionality, improved serial communication techniques are needed to accommodate high-priority, low-latency functions including management functions that facilitate coexistence in a multi-radio device.

SUMMARY

Certain aspects of the disclosure relate to systems, apparatus, methods and techniques that can enable devices to exchange latency in messages transmitted over a communication link. Latency information may be included in messages transmitted over multi-drop communication links where arbitration schemes or priority messages can produce uncertain latency times for a variety of applications. Devices may be coupled to the communication link may be implemented through a parallel or serial interface. In one example, a multi-purpose, multidrop serial bus operated in accordance with certain aspects of this disclosure can be used for power management without adversely affecting peak performance of a managed device. A power management or other message may be adapted to include time information related to the latency associated with transmission of the message.

In various aspects of the disclosure, a method of managing power at a power management integrated circuit includes determining that current consumption by a managed device exceeds a threshold level, generating an extended current level message to be transmitted to the managed device, and transmitting a time value with the extended current level message, the time value indicative of an elapsed time between generation of the extended current level message and start of transmission of the extended current level message.

In various aspects of the disclosure, a power management integrated circuit includes a bus interface circuit configured to couple the power management integrated circuit to a serial bus, one or more regulator circuits configured to provide current to a managed device, and a controller. The controller is configured to determine that current consumption by the managed device exceeds a threshold level, generate an extended current level message to be transmitted over the serial bus to the managed device and transmit a time value with the extended current level message, the time value indicative of an elapsed time between generation of the extended current level message and start of transmission of the extended current level message.

In various aspects of the disclosure, a data communication apparatus has means for determining that current consumption by a managed device exceeds a threshold level, means for generating an extended current level message to be transmitted to the managed device, and means for transmitting a time value with the extended current level message, the time value indicative of an elapsed time between generation of the extended current level message and start of transmission of the extended current level message.

In various aspects of the disclosure, a processor-readable storage medium stores or maintains code for determining that current consumption by a managed device exceeds a threshold level, generating an extended current level message to be transmitted to the managed device, and transmitting a time value with the extended current level message, the time value indicative of an elapsed time between generation of the extended current level message and start of transmission of the extended current level message.

In various aspects of the disclosure, method of managing power in an integrated circuit device includes receiving an extended current level message from a serial bus, the extended current level message including a time value indicative of an elapsed time between generation of the extended current level message and start of transmission of the extended current level message and initiating a reduction in current consumption at a time calculated based on the time value.

In various aspects of the disclosure, an integrated circuit device includes a bus interface circuit operated in accordance with a system power management interface protocol and configured to couple the integrated circuit device to a serial bus and a controller. The controller is configured to receive an extended current level message from the serial bus, the extended current level message including a time value indicative of an elapsed time between generation of the extended current level message and start of transmission of the extended current level message and initiate a reduction in current consumption at a time calculated based on the time value.

In various aspects of the disclosure, a data communication apparatus has means for receiving an extended current level message from a serial bus, the extended current level message including a time value indicative of an elapsed time between generation of the extended current level message and start of transmission of the extended current level message and means for initiating a reduction in current consumption at a time calculated based on the time value.

In various aspects of the disclosure, a processor-readable storage medium stores or maintains code for receiving an extended current level message from a serial bus, the extended current level message including a time value indicative of an elapsed time between generation of the extended current level message and start of transmission of the extended current level message and initiating a reduction in current consumption at a time calculated based on the time value.

DETAILED DESCRIPTION

Figure 1:
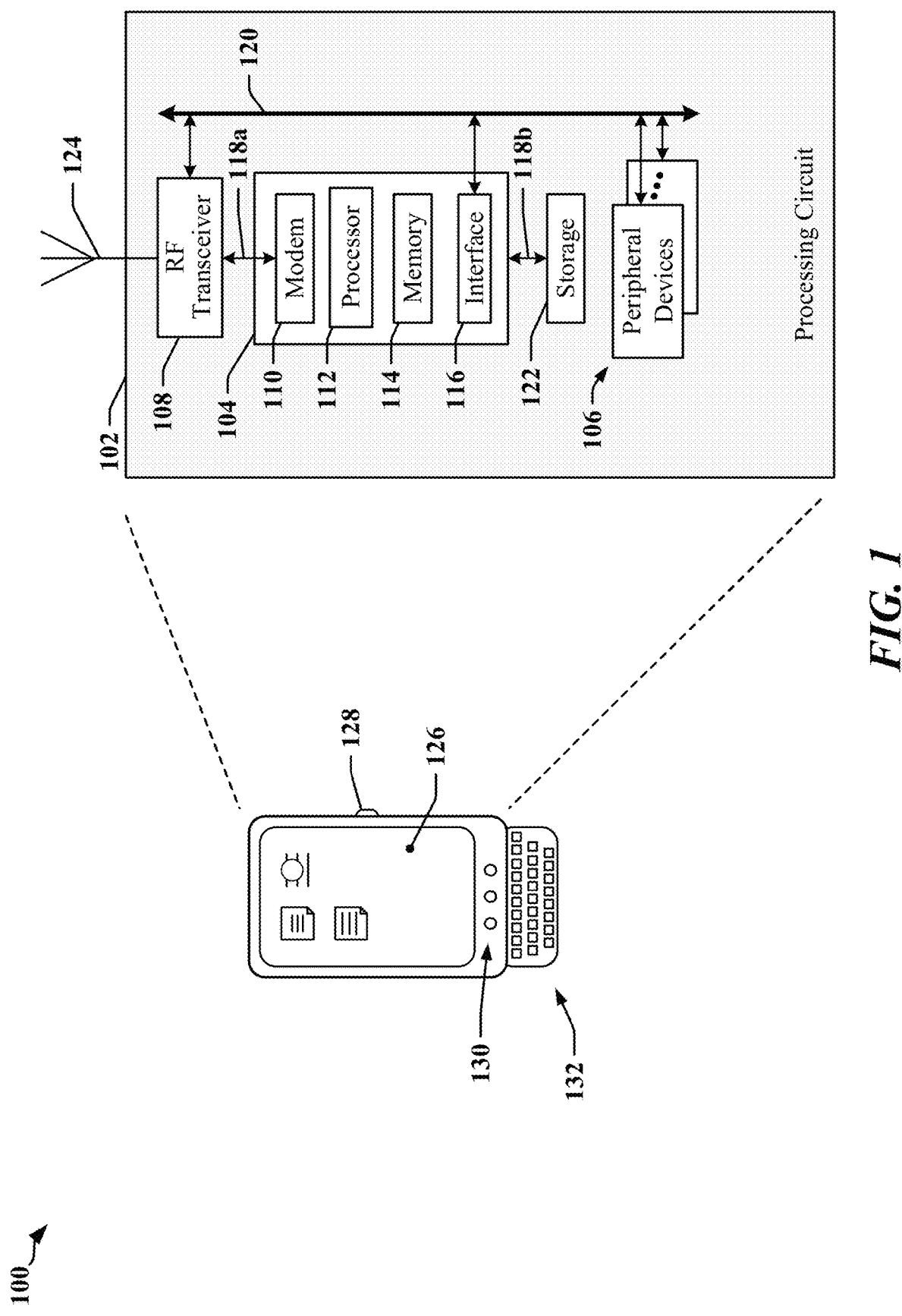
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain concepts disclosed herein are described in relation to serial communication links and, in particular to wired, multi-drop serial buses used for communication within or between integrated circuit devices. The concepts disclosed herein are equally applicable to other types of communication link, and the use of a wired, multi-drop serial bus to facilitate description enables descriptions of many concepts to be described concurrently.

Overview

Devices that include multiple devices, SoCs or other IC devices often employ a shared communication interface that may include a parallel bus, serial bus, wireless data link or a combination of communication links to connect processors with modems and other peripherals. The serial bus or other data communication link may be operated in accordance with standards or protocols. For example, a serial bus may be operated in accordance with an I2C, I3C, SPMI or RFFE protocol, or another protocol. The serial bus may be configured for half-duplex operation. Increased utilization of serial buses, and/or the imposition of more stringent timing constraints in support of various applications, peripherals and sensors drives demand for reduced transmission latencies. Transmission latency may include the time required to terminate a transaction in process on the serial bus, bus turnaround (between transmit mode and receive mode), bus arbitration or command transmissions specified by protocol.

High bus latency can limit the capabilities and functionality of a bus in certain applications. In one example, indeterminate bus latencies can cause power control circuits to unnecessarily reduce power consumption before deadlines for mitigation defined by specification, protocol or application have occurred. For example, mitigation may be initiated at a time calculated based on worst case bus latency even when low bus latency is experienced. In another example, bus latency considerations may limit the number of sensors that can be coupled by an I3C, RFFE or SPMI bus. For example, certain applications specify maximum delays for reading sensor information after occurrence of an event or in response to an interrupt, and may further specify time limits in which multiple sensors are to be read. In another example, bus latency considerations may limit the number of RF devices that can be coupled by an I3C, RFFE or SPMI bus when the bus is to be used for coexistence messaging and other operations in radio frequency ICs that require very low-latency communications. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. Congestion and increased latencies can also result from communication overhead associated with certain protocols used to control the serial bus.

Advances in RF technology, increased complexity of applications and the introduction of increased capabilities in communication devices increase pressure on latency times associated with serial and parallel communication links. Certain aspects of this disclosure relate to transmitting measured bus latency information with mitigation interrupts or messages. Certain examples disclosed herein are described in relation to extended current limit messages although the concepts are equally applicable to other types of messages that are latency sensitive or that involve synchronization of actions.

Examples of Apparatus that Employ Serial Data Links

Certain aspects of this disclosure will be described using the example of latencies associated with serial data links. According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device.

FIG. 1 illustrates an example of an apparatus 100 that employs a data communication bus. The apparatus 100 may include an SoC, or a processing circuit 102 having multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or an external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
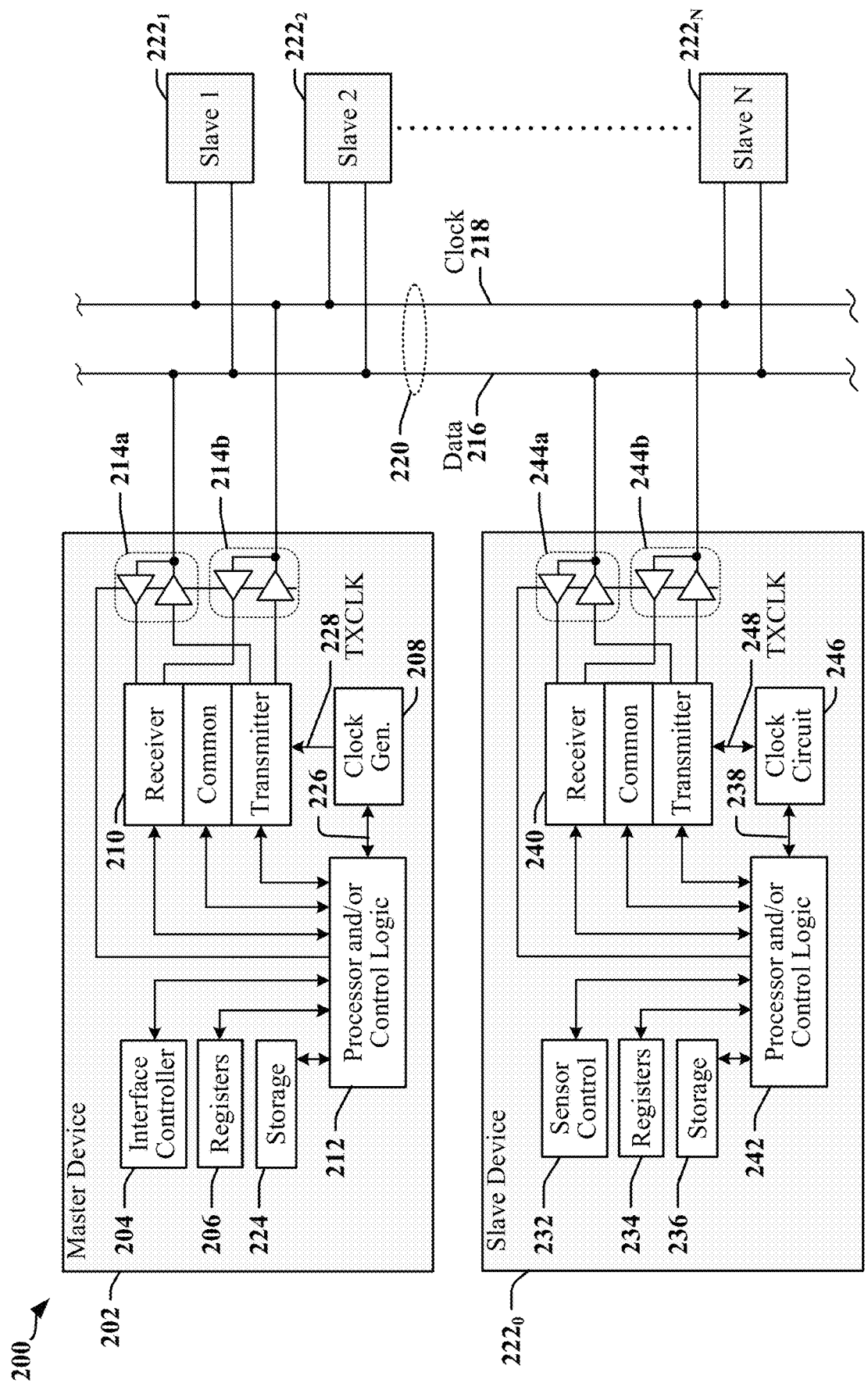
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI or other protocol. In some instances, two or more devices 202, $222_0$-$222_N$ may be configured to operate as a bus master device on the serial bus 220. Data is transmitted on a data line 216 of the serial bus 220 based on timing information provided in a clock signal transmitted on the clock line 218 of the serial bus 220.

The MIPI Alliance defines SPMI protocols and standards that specify a hardware interface to be implemented between baseband or application processors and peripheral components to support a variety of data communication functions including data communication related to power management operations.

Figure 3:
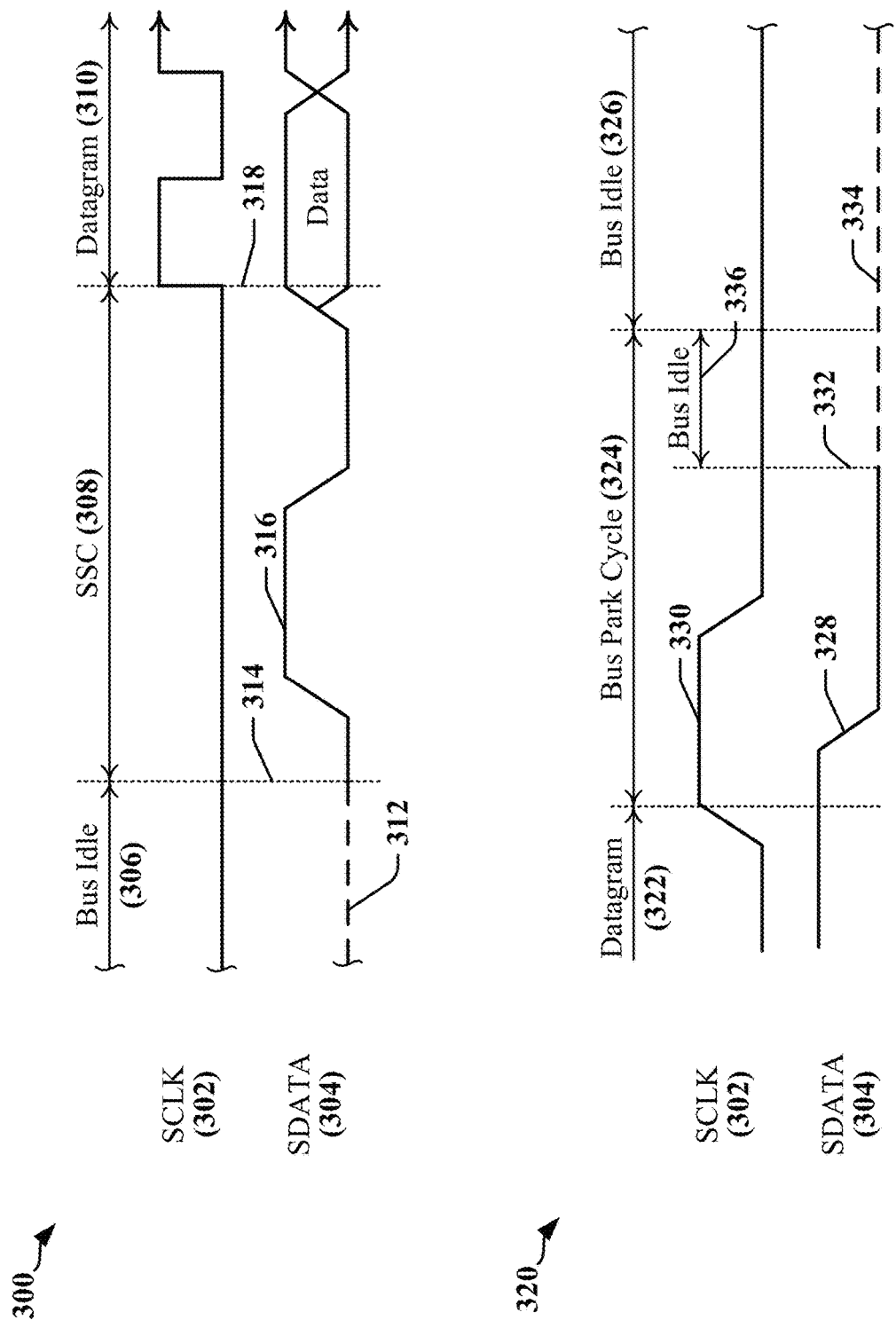
FIG. 3 includes timing diagrams that illustrate signaling transmitted to delineate the boundaries of SPMI datagrams.

FIG. 3 includes timing diagrams 300, 320 that illustrate signaling that is transmitted to delineate the boundaries of SPMI datagrams. The timing diagrams 300, 320 show the relative timing of signals transmitted on SCLK 302 and SDATA 304. The first timing diagram 300 illustrates timing of a sequence start condition (SSC 308) that is transmitted to signal the start of a datagram 310. The SSC 308 is transmitted when the serial bus is in an idle state 306. In the idle state 306, SCLK 302 is driven at full strength by a bus master while slave devices coupled to the serial bus present a high impedance to SCLK 302. SCLK 302 is held in the low signaling state (here, at zero volts) by the bus master. In the idle state 306, SDATA 304 is weakly driven by the bus master and held or maintained in the weakly driven low signaling state 312. The weakly driven low signaling state 312 can easily be overcome by another line driver that can drive SDATA 304 at full strength.

In a master-driven SSC 308, the bus master commences transmission of the SSC 308 at a first point in time 314 when it begins to drive SDATA 304 at full strength, initially at the low signaling state. The bus master then provides a pulse 316 on SDATA 304 while continuing to drive SCLK 302 to the low signaling state. The pulse 316 has duration of at least one cycle of a clock signal provided on SCLK 302 during transmission of a datagram 310. At a second point in time 318, the bus master commences transmission of clock pulses on SCLK 302, thereby providing the clock signal used to control or indicate timing of a datagram 310 transmitted on SDATA 304.

The second timing diagram 320 illustrates timing of a bus park cycle (the BPC 324) that may be transmitted to signal the termination of a datagram 322, for example. The BPC 324 is transmitted by providing a falling edge 328 on SDATA 304 while SCLK 302 is in a high signaling state 330. Transitions on SDATA 304 are permitted low portion of the clock signal during transmission of the datagram 322, and the falling edge 328 is clearly recognizable as BPC 324 signaling. The falling edge 328 is provided by the bus master driving SDATA 304 low at full strength. The bus master then drives SCLK 302 low and continues to drive SCLK 302 at full strength through subsequent bus idle intervals 326, 336. After driving SCLK 302 low, the bus master initiates a bus idle interval 336 at a time 332 when the bus master causes SDATA 304 to enter the weakly driven low signaling state 334. The BPC 324 is terminated and the serial bus enters a bus idle interval 326 until the next datagram is ready for transmission.

Figure 4:
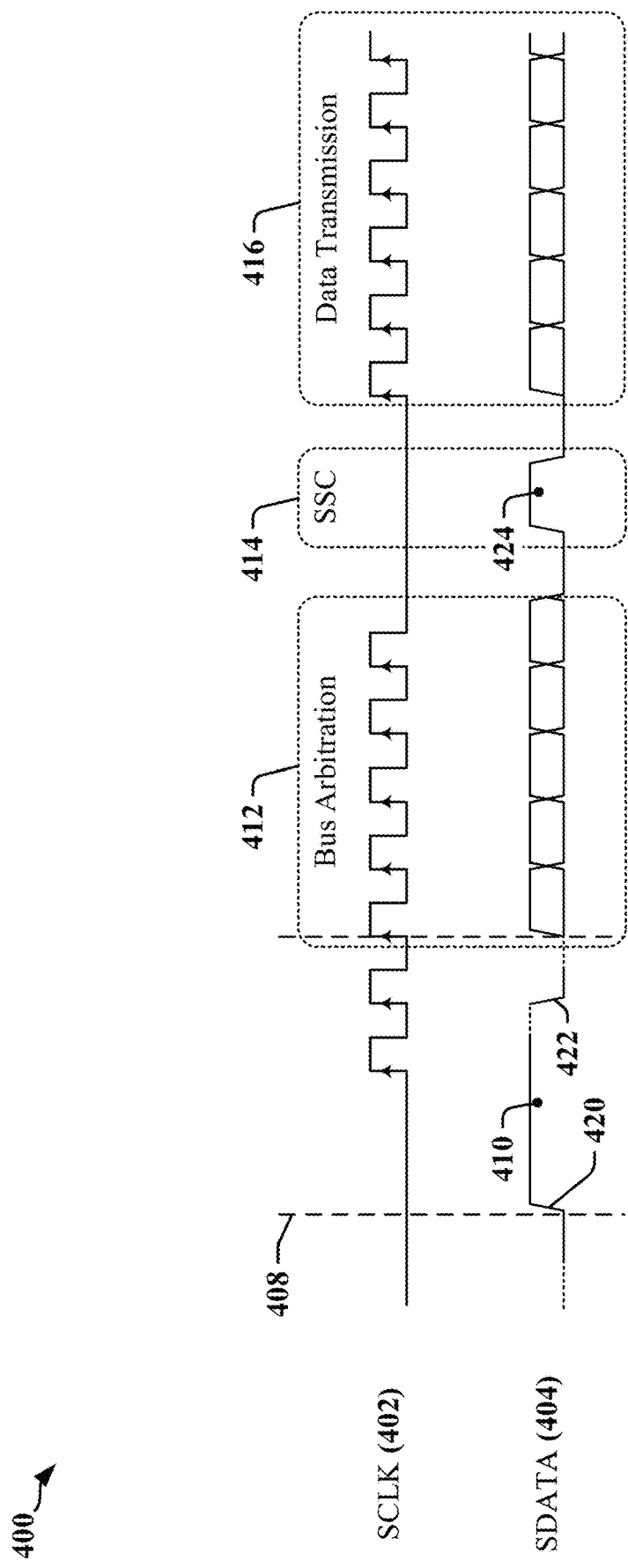
FIG. 4 illustrates a system that includes a data communication link configured as a two-wire serial bus operated in accordance with SPMI protocols.

FIG. 4 illustrates certain aspects related to the timing of an SPMI transaction 400 executed through a data communication link. The transaction 400 commences at with a bus arbitration procedure 412 in which an initiating device indicates a desire to write or read data over the data communication link. The bus arbitration procedure 412 is performed to determine the highest-priority device seeking to use the data communication link. Device priority may be determined based on a device identifier and the highest-priority device participating in the bus arbitration procedure 412 is generally granted control of the data communication link. At a point in time 408, the initiating device drives a first pulse 410 on SDATA 404. Consistent with SPMI protocols, the current bus master provides a clock signal on SCLK 402 after detecting the rising edge 420, and the initiating device releases SDATA 404 during the first clock cycle. The bus master then drives SDATA 404 to provide the falling edge 422 of the first pulse 410. The winning device may then provide a Sequence Start Condition (the SSC 414) by transmitting a second pulse 424 on the SDATA 404 while the clock signal on SCLK 402 is held in a low signaling state. A data transmission 416 may ensue.

In some aspects of this disclosure, a power management integrated circuit (PMIC) uses voltage regulators to control direct current (DC) voltage levels in one or more IC devices. The voltage regulators may include or cooperate with buck converters that operate as DC-to-DC power converter that can support current loads at levels increased by up to 20% or more over the rated or configured high current level associated with full-performance operation of processing circuits in SoC or other IC devices, including modems, application processors and certain peripherals. The use of a buck converter enables a processing circuit to receive higher current and operate at higher performance levels for a limited period of time. The limit on time may be imposed to preserve energy in a battery, control or avoid heat accumulation and for other reasons. The PMIC may send a message or telegram to cause the SoC, IC or processing circuit to mitigate or reduce its current draw after operating at the higher performance level for a predefined or preconfigured time. In some examples, the processing circuit can mitigate its performance by changing scheduling for certain intensive applications or by suspending or terminating certain functions, applications or activities.

For the purposes of illustrating certain aspects of this disclosure, a buck converter in a PMIC illustrated in certain of the drawings can be configured to provide an increase in current up to a factor of 1.2 times a rated high performance load current while maintaining rated regulated voltage. The PMIC may define a high performance current limit (CLH) and an extended current limit (CLX) where, for example, CLX=1.2 CLH. The PMIC implements a qualification scheme used to determine when CLH is exceeded such that a device is operating using extended current. In some examples, the qualification scheme filters out low density excursions above CLH and allows performance level to be increased for short periods of time without hyper-active mitigation requirements. The qualification scheme can provide the advantage of higher peak baseline performance levels with mitigation when average current consumption exceeds CLH for a time that meets or exceeds a qualification period, which may be referred to herein as a Qualified Window or as Q_time. In some instances, the duration of the qualification period may be related to the magnitude of the current usage above CLH. Excursions of current usage above CLH before the qualification period has ended may be referred to as unqualified CLX performance. Current usage above CLH after the qualification period has ended may be referred to as qualified CLX performance. The PMIC may require mitigation of current consumption by a processing circuit to ensure that the higher performance operation does not exceed the time-limited period (CLX_Time) defined for qualified CLX performance.

In some systems, the PMIC raises an interrupt at some point after the Qualified Window has expired and during the CLX_Time when the load current continues to exceed the pre-defined threshold (e.g., CLH). The SoC, IC or processing circuit is expected to mitigate performance in order to reduce the load current to less than CLH before CLX_Time has expired. In systems configured in accordance with certain aspects of this disclosure, the interrupt can be sent between SoCs, ICs, processing circuits or other devices using a multidrop bus and can be communicated within an SoC, IC, processing circuit or other device using an internal common central broadcast (BCST) bus. The internal common central broadcast bus may be referred to as the common bus (CB). In one example, a multidrop serial bus operated in accordance with SPMI protocols may be used for communicating interrupts between the SoCs, ICs, processing circuits or other devices. An interrupt relayed in messages over both SPMI and CB interfaces that are used for sending a variety of different types of messages and interrupts may be subject to a variable and often unpredictable latency based on the load of the buses.

Figure 5:
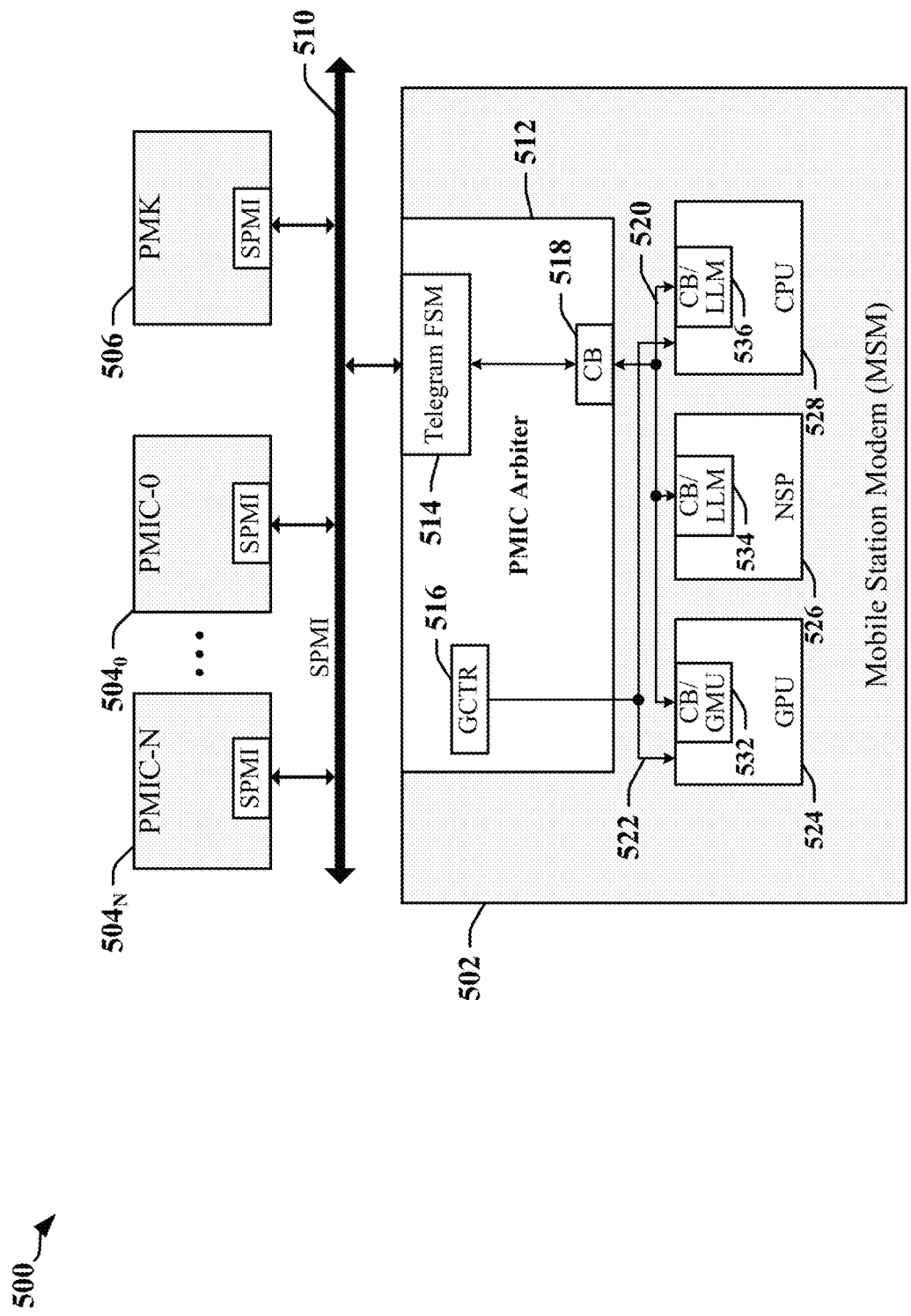
FIG. 5 illustrates a system that includes a power management integrated circuit that transmits current limit mitigation messages over a serial bus operated in accordance with SPMI protocols.

FIG. 5 illustrates an example of a system 500 which includes a data communication link that is configured as a two-wire serial bus 510 operated in accordance with SPMI protocols and a CB 520 used for internal communication in a modem 502. The two-wire serial bus 510 can be used to connect an integrated power controller of an application processor or modem 502 with voltage regulation systems in one or more PMICs $504_0$-$504_N$, 506. In the illustrated example, one or more PMICs $504_0$-$504_N$, 506 includes a buck converter. The two-wire serial bus 510 may be used to carry various types of messages used to monitor and control processor performance levels required for a given workload or application and to dynamically control the various supply voltages in real time based on performance levels. The two-wire serial bus 510 can be used to carry other types of data between the modem 502 and PMICs $504_0$-$504_N$, 506, between the between the PMICs $504_0$-$504_N$, 506 and an application processor or between the modem 502 and the application processor.

Interrupts used to initiate performance mitigation may be transmitted in a telegram. The telegram may be received at the modem 502 and processed using a finite state machine 514 that cooperates with a PMIC arbiter 512 in order to direct the interrupt included in the telegram to one or more intended destinations. The interrupt or telegram may be forwarded through an interface circuit 518 and over the CB 520 to one or more destinations, which may include a graphics processing unit (the GPU 524) accessed through a graphics management unit (the GMU 532,) a central processing unit (the CPU 528) through a local limits manager (LLM) 536 and/or a nanoscale package (the NSP 526) accessed through an LLM 534.

The PMIC arbiter 512 may provide hardware and software bus masters that can be provided with concurrent and autonomous access to the PMICs $504_0$-$504_N$, 506 through the SPMI-operated two-wire serial bus 510. The PMIC arbiter 512 may include the SPMI interface and a real-time clock generator or global counter (the GCTR 516) which may use a crystal oscillator and may be referred to as the CXO. In one example, the GCTR 516 produces a clock signal 522 with a period of 52.08 nanoseconds.

In some examples, a destination of the mitigation interrupt, such as the GPU 524, the CPU 528 or the NSP 526 is unable to determine when the interrupt was generated at the PMICs $504_0$-$504_N$ or 506 due to the variability of latencies associated with transmissions over the two-wire serial bus 510 and the CB 520. The GPU 524, the CPU 528 and/or the NSP 526 necessarily assume worst case latency and begin mitigation accordingly, which can result in sub-optimal performance.

Figure 6:
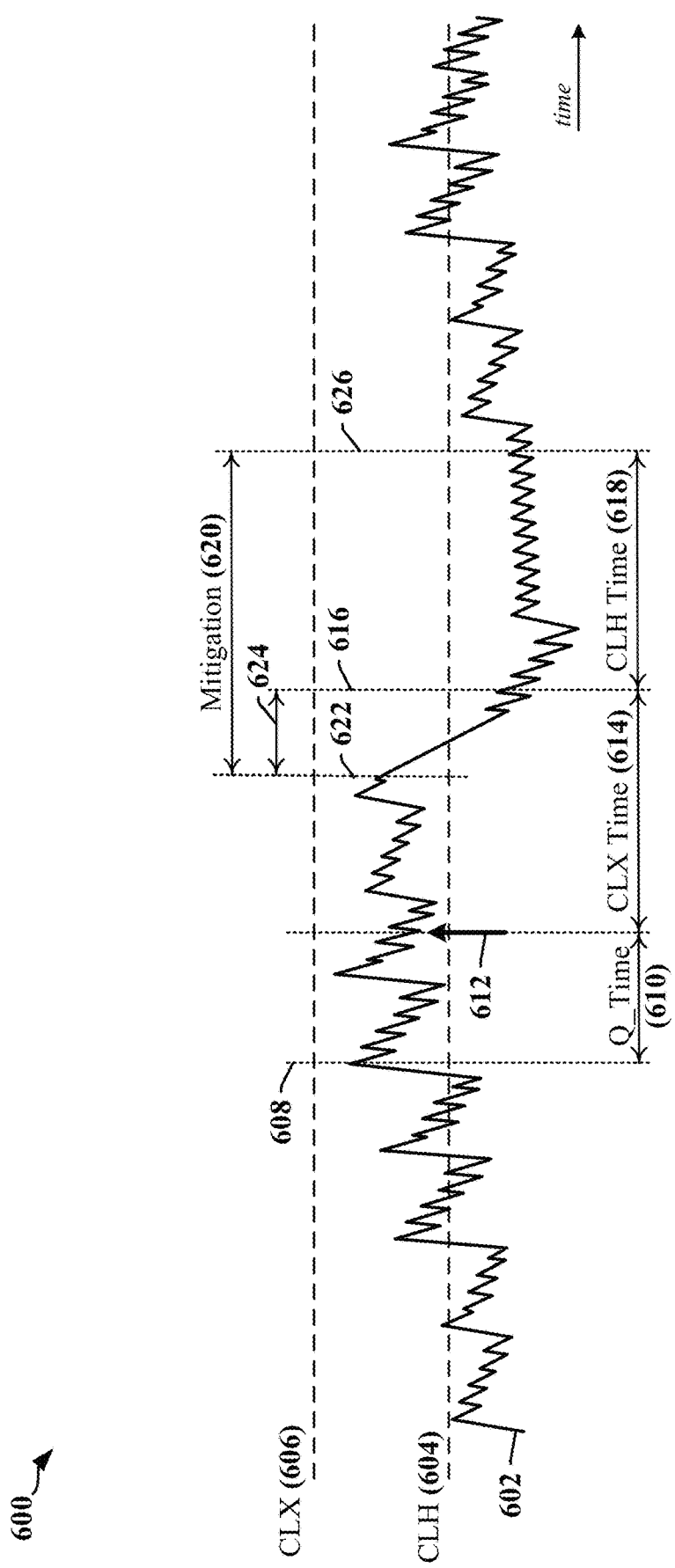
FIG. 6 is a timing diagram that illustrates an example of current consumption associated with the system of FIG. 5.

FIG. 6 includes an example of power consumption 600 associated with the system 500. In the illustrated example, the system 500 is initially operating below CLH 604 and CLX 606, with current usage 602 increasing over time. Current usage 602 may peak above CLH 604 for short periods of time without initiating mitigation timing due to the operation of qualification filters that filter out low-density excursions above CLH 604. At time 608, the current usage 602 is determined to exceed CLH 604 and a qualification time (Q_Time 610) commences. The current usage 602 remains above CLH 604 and at time 612 the current usage 602 is deemed to enter CLX Time 614. CLX Time 614 is limited in duration and the PMIC $504_0$-$504_N$ or 506 may generate an interrupt that is transmitted in a telegram or message to the GPU 524, the CPU 528 or the NSP 526. The GPU 524, the CPU 528 or the NSP 526 responds to the interrupt message by mitigating current usage 602. Mitigation is initiated to ensure that current usage 602 has dropped below CLH 604 before the end of CLX Time 614. In conventional systems, the GPU 524, the CPU 528 or the NSP 526 are unable to determine the time elapsed since the interrupt was generated and assume worst case latency. A mitigation period 620 begins at time 622. The duration of time 624 between the time 622 that mitigation commences and the end 616 of the CLX Time 614 includes a time difference between worst case latency and actual latency associated with communication of the interrupt. This time difference represents a loss of peak performance in the CLX Time 614. The current usage 602 is constrained to remain below CLH 604 until the end 626 of the mitigation period 620.

In one example, SPMI bus latency for a one-byte slave message read by the master is 2.87 µs and the latency for a two-byte message written by the master to the slave is 3.7 µs. The best case bus latency occurs when the bus is not loaded and corresponds to 2.87 µs. An example of worst case SPMI bus latency is observable when the serial bus is busy and handles 10 consecutive CLX messages transmitted with the same priority. In this example, worst case latency=3.75 µs+10*2.87 µs=32.5 µs. An example of worst case CB latency is 30 µs in certain modes of operation. The worst case interrupt transmission latency may be estimated as 62.5 µs in this example, where CLX TIME 614 may be defined as 100 µs. In conventional systems, mitigation initiated based on worst case latency to meet specifications governing PMIC operation can result in sub-optimal performance when low latency conditions exist.

A system adapted in accordance with certain aspects of this disclosure can extend periods of peak performance when a PMIC enables extended current limits. In some examples, a timestamp is transmitted in a CLX message. The timestamp provides a measured latency for transmission of the message that enables the receiver to begin mitigation closer to the end of the CLX Time. The timestamp may operate to remove or reduce uncertainties over SPMI arbitration latencies and CB interface latency.

Figure 7:
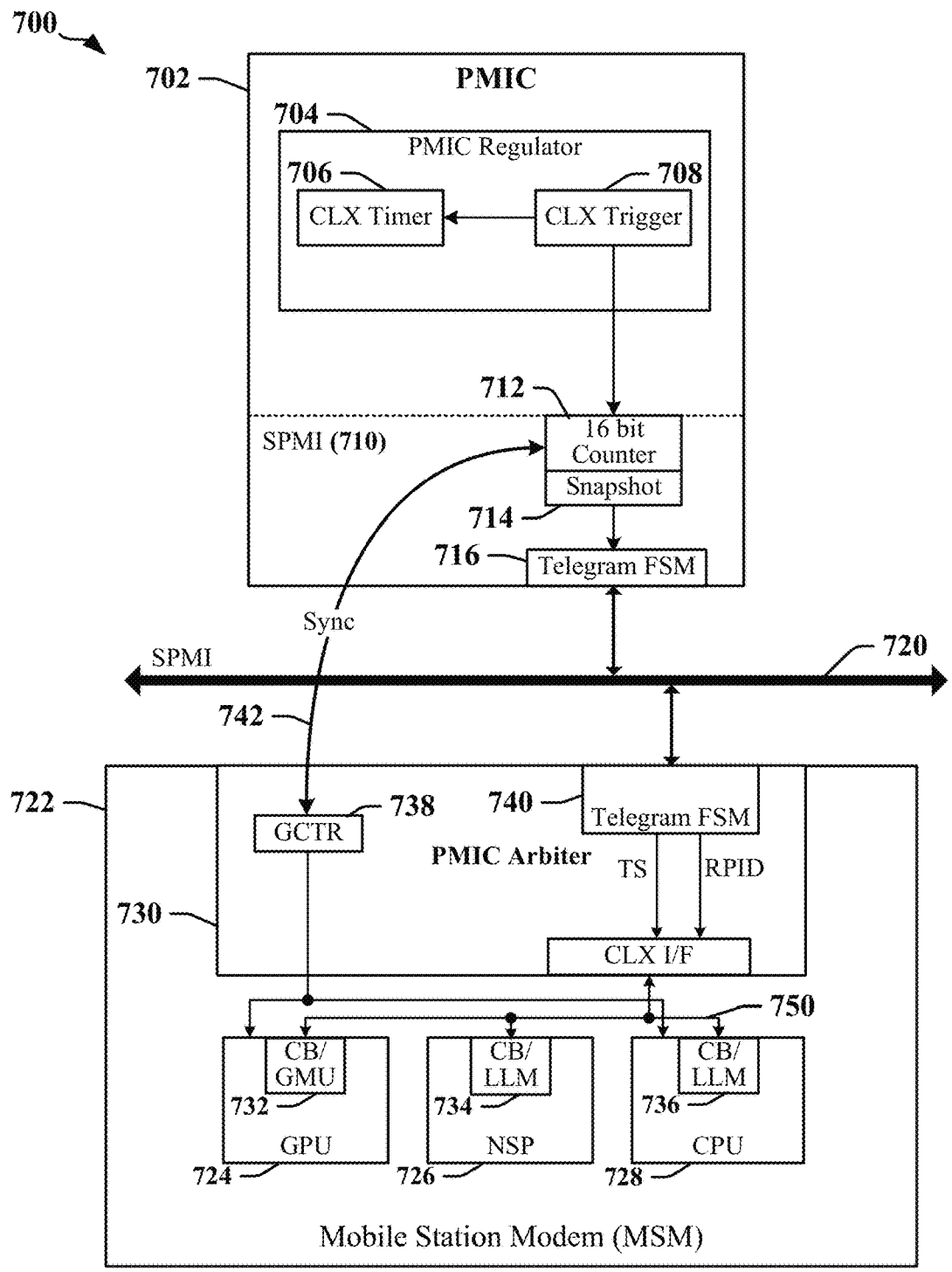
FIG. 7 illustrates a first system that can transmit latency information with current limit mitigation messages in accordance with certain aspects of this disclosure.

With reference to the system 700 illustrated in FIG. 7, a 16-bit counter 712 provided in the SPMI interface 710 of a PMIC 702 may be synchronized with a global counter 738 in the modem 722. The PMIC 702 has a PMIC regulator 704 that includes a CLX timer 706 that tracks the CLX TIME and that may be initiated by a CLX trigger circuit 708. In one example, the CLX trigger circuit 708 includes qualification filters. The PMIC 702 has a finite state machine 716 that is configured to generate CLX telegrams in response to information received from the PMIC regulator 704. A snapshot register 714 is read and transmitted with an CLX message. In some examples, the global counter 738 may be clocked by a real time clock signal obtained from a crystal oscillator. In one example, the global counter 738 may be clocked by a clock signal that has a 52.08 ns period such that the lower 8 bits cycles at a period of 13.33 µs and the 16-bit counter 712 wraps after 3.4 ms. The snapshot register 714 may capture 7 or 8 bits of the 16-bit counter 712 to measure latency time. In one example, the snapshot register 714 includes 8 counter bits that can measure a period of 256 µs, which is sufficient to measure a CLX TIME of 100 µs. In the latter example, the CLX telegram should be transmitted within 256 µs to avoid uncertainty arising from the counter wrapping period associated with the 8 bits. In one example, the snapshot register 714 includes 7 counter bits that can measure a period of 128 µs, which is sufficient to measure a CLX TIME of 100 µs. In the latter example, the CLX telegram should be transmitted within 128 µs to avoid uncertainty arising from the wrapping period associated with the 7 bits. The number of counter bits transmitted in the CLX telegram may be configured based on desired resolution of latency measurement and available bits in the CLX telegram after bits have been assigned for interrupt-related information. In one example, a two-byte CLX telegram includes 8 bits of interrupt related information and 8 counter bits. In another example, a two-byte CLX telegram includes 9 bits of interrupt related information and 7 counter bits. In one example, the interrupt related information identifies one or more PMIC regulators 704 that generated an interrupt within the PMIC 802. In some instances, the interrupt related information includes an identifier of the PMIC regulator 704 that generated an interrupt. In some instances, the interrupt related information includes bit locations that may be set to indicate the PMIC regulators 704 that generated the interrupt. The LLM blocks 732, 734, 736 in a destination (GPU 724, the NSP 726 or the CPU 728) may use the CLX timestamp for performance improvement.

The system 700 includes a data communication link that is configured as a two-wire serial bus 720 operated in accordance with SPMI protocols and a CB 750 used for internal communication in a modem 722. The two-wire serial bus 720 can be used to connect an integrated power controller of the modem 722 with voltage regulation systems in one or more PMICs 702. In the illustrated example, a PMIC 702 includes a buck converter. The two-wire serial bus 720 may be used to carry various types of messages used to monitor and control processor performance levels required for a given workload or application and to dynamically control the various supply voltages in real time based on performance levels. The two-wire serial bus 720 can be used to carry other types of data between the modem 722 and PMIC 702.

Interrupts used to initiate performance mitigation may be transmitted in a telegram. The telegram may be received at the modem 722 and processed using a finite state machine 740 that cooperates with a PMIC arbiter 730 in order to direct the interrupt included in the telegram to one or more intended destinations. The interrupt or telegram may be forwarded over the CB 750 to one or more destinations, which may include a GPU 724 a CPU 728 and/or a NSP 726.

The PMIC arbiter 730 may provide hardware and software bus masters that can be provided with concurrent and autonomous access to the PMIC 702 through the SPMI-operated two-wire serial bus 720. The PMIC arbiter 730 may include the SPMI interface and the global counter 738.

Figure 8:
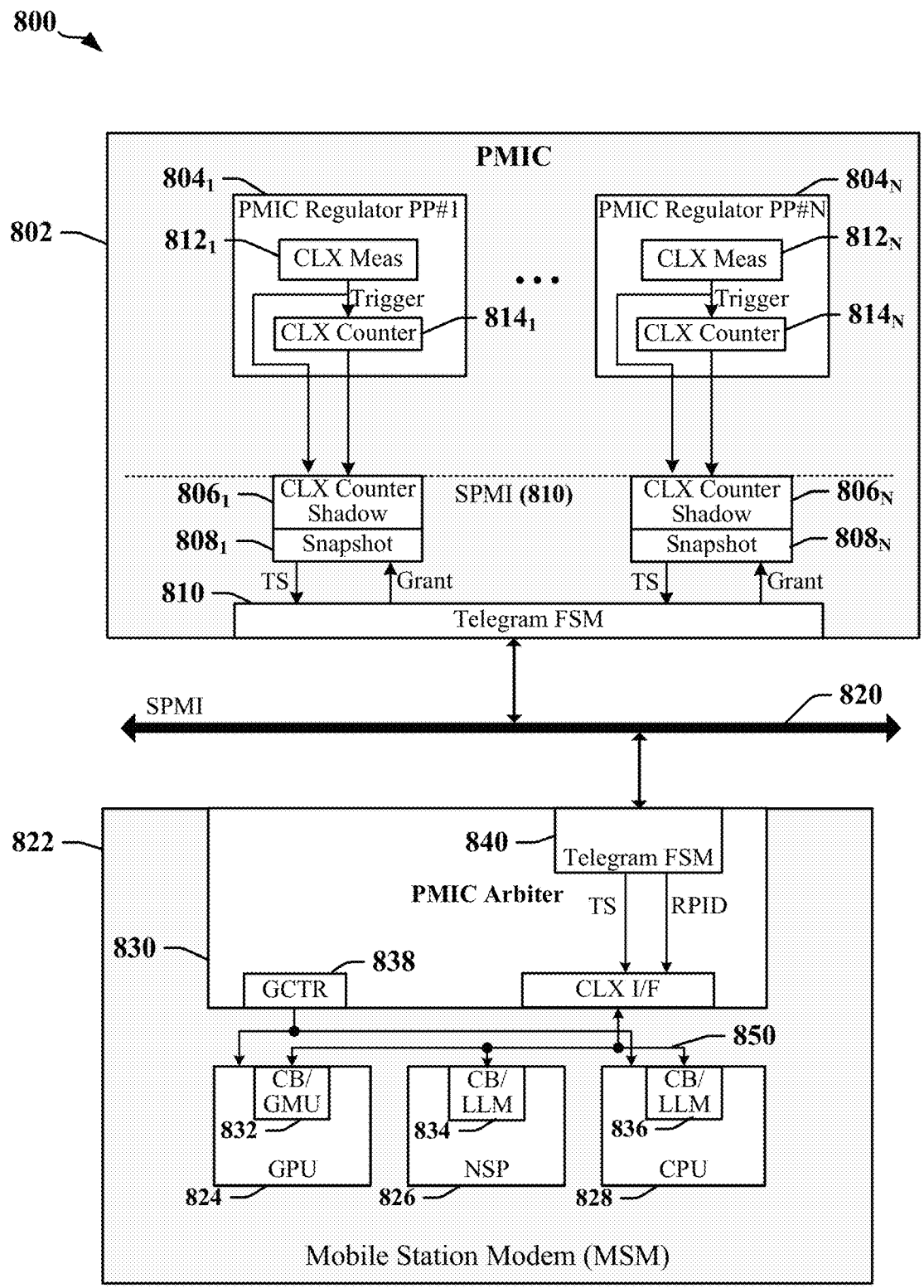
FIG. 8 illustrates a second system that can transmit latency information with current limit mitigation messages in accordance with certain aspects of this disclosure.

In some examples, a synchronized counter may be unavailable for tracking latency associated with a CLX telegram. FIG. 8 illustrates a system 800 that corresponds to, and expands upon the system 700 illustrated in FIG. 7, but that lacks a synchronized counter. The system 800 is depicted as including multiple PMIC regulators $804_1$-$804_N$. A PMIC 802 has a finite state machine 810 that is configured to generate CLX telegrams in response to information received from one or more of the PMIC regulators $804_1$-$804_N$. A CLX counter $814_1$-$814_N$ provided in each PMIC regulator $804_1$-$804_N$ is triggered by a corresponding current level measurement circuit $812_1$-$812_N$ when a measured current level exceeds CLX. A CLX counter shadow $806_1$-$806_N$ corresponding to each PMIC regulator $804_1$-$804_N$ may be configured to enable CLX telegram latency to be determined based on differences in counter values captured when the trigger is generated and the CLX telegram is transmitted over the serial bus 820. A timestamp may be read from a snapshot register $808_1$-$808_N$ and transmitted in the CLX telegram. In some examples, the CLX counters $814_1$-$814_N$ are clocked by an internal clock signal. In some examples, the CLX counters $814_1$-$814_N$ are clocked by a clock signal received from the serial bus 820.

The number of counter bits transmitted in the CLX telegram may be configured based on desired resolution of latency measurement and available bits in the CLX telegram after bits have been assigned for interrupt-related information. In one example, a two-byte CLX telegram includes 8 bits of interrupt related information and 8 counter bits. In another example, a two-byte CLX telegram includes 9 bits of interrupt related information and 7 counter bits. In some instances, the interrupt related information includes an identifier of the PMIC regulator $804_1$-$804_N$ that generated an interrupt. In some instances, the interrupt related information includes bit locations that may be set to indicate the PMIC regulator $804_1$-$804_N$ that generated the interrupt.

In some examples, a global counter 838 in the modem 822 is used to ascertain the latency time based on the timestamp provided in the CLX telegram. In one example, the global counter 838 may be clocked by a real time clock signal obtained from a crystal oscillator. In one example, the global counter 838 may be clocked by a clock signal that has a 52.08 ns period such that the lower 8 bits cycles at a period of 13.33 µs. The timestamp may enable destination devices, which may include a GPU 824 a CPU 828 and/or a NSP 826, to remove interface arbitration latencies associated with the two-wire serial bus 820 and the CB 850.

Figure 9:
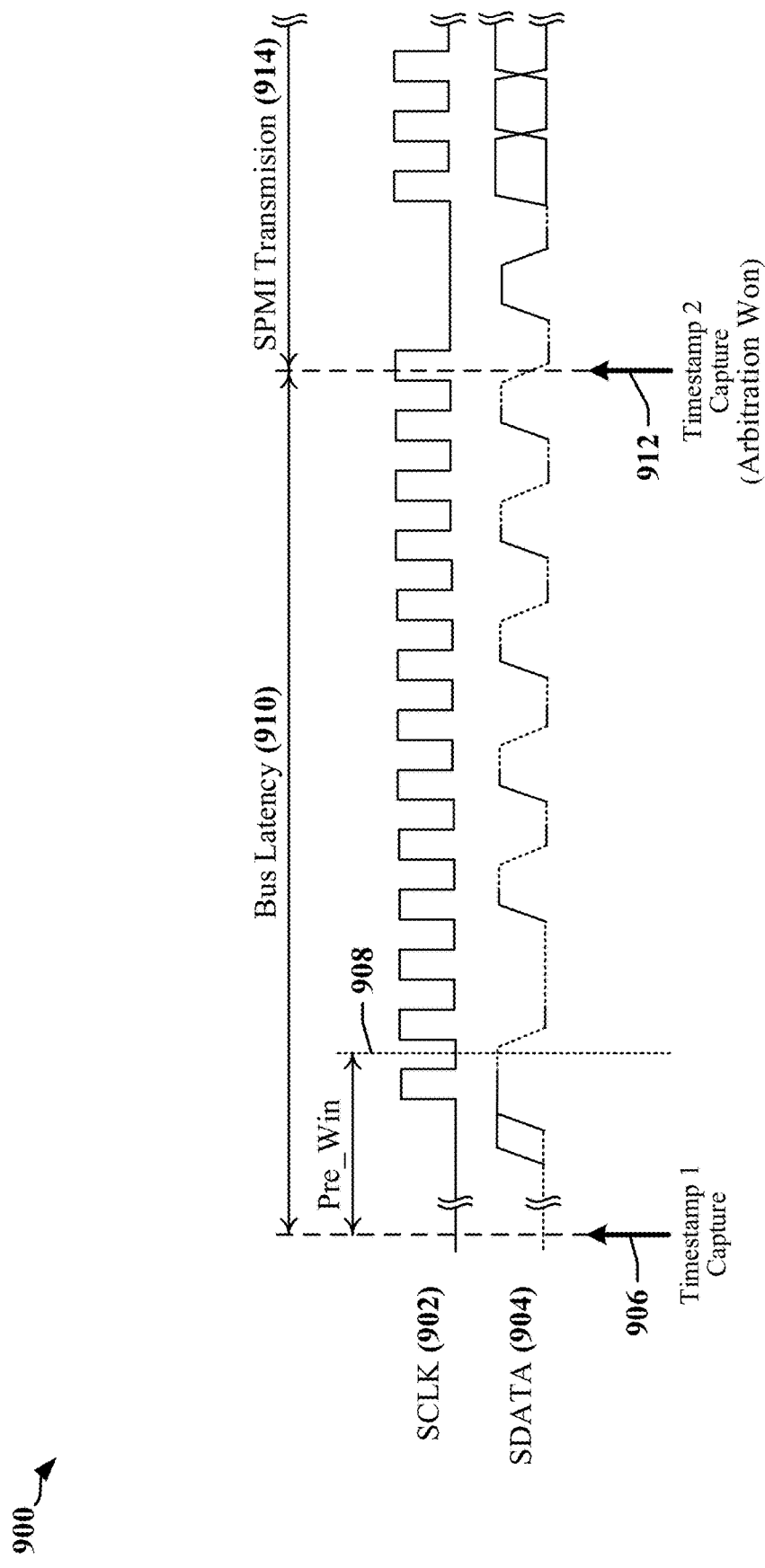
FIG. 9 is a timing diagram that illustrates an example of the generation of latency information with current limit mitigation messages in accordance with certain aspects of this disclosure

With reference also to the timing diagram 900 of FIG. 9, a first snapshot of the CLX counter $814_1$-$814_N$ in a PMIC regulator $804_1$-$804_N$ may be captured at time 906 when a trigger is detected. In this example, one or more arbitration procedures are executed on SCLK 902 and SDATA 904 of the serial bus 820 before a final arbitration procedure is initiated at time 908. Upon winning the arbitration, at time 912 a second snapshot of the CLX counter $814_1$-$814_N$ in the PMIC regulator $804_1$-$804_N$ is captured. The successful arbitration outcome may be indicated by the SPMI interface in the PMIC 802. The difference between the first and second snapshot values may represent the bus latency 910 associated with the trigger. A two-byte CLX telegram may be transmitted with a CLX timestamp that represents the difference between the first and second snapshot values. The timestamp may be combined with a fixed value for SPMI telegram transmission latency 914 to obtain a CLX trigger latency. The CLX trigger latency may be subtracted from a current time value provided by the global counter 838, where the original CLX time stamp may be calculated as:

GCTR_current_value−(timestamp_difference_delta+
SPMI_telegram_latency).

The LLM block 832, 834, 836 in the destination (GPU 824, the NSP 826 or the CPU 828) may use the calculated original CLX timestamp for performance improvement.

The system 800 includes a data communication link that is configured as a two-wire serial bus 820 operated in accordance with SPMI protocols and a CB 850 used for internal communication in a modem 822. The two-wire serial bus 820 can be used to connect an integrated power controller of the modem 822 with voltage regulation systems in one or more PMICs 802. In the illustrated example, a PMIC 802 includes a buck converter. The two-wire serial bus 820 may be employed to carry various types of messages used to monitor and control processor performance levels required for a given workload or application and to dynamically control the various supply voltages in real time based on performance levels. The two-wire serial bus 820 can be used to carry other types of data between the modem 822 and PMIC 802.

Interrupts used to initiate performance mitigation may be transmitted in a telegram. The telegram may be received at the modem 822 and processed using a finite state machine 840 that cooperates with a PMIC arbiter 830 in order to direct the interrupt included in the telegram to one or more intended destinations. The interrupt or telegram may be forwarded over the CB 850 to one or more destinations, which may include a GPU 824 a CPU 828 and/or a NSP 826. The PMIC arbiter 830 may include hardware and software bus masters that may be provided with concurrent and autonomous access to the PMIC 802 through the SPMI-operated two-wire serial bus 820. The PMIC arbiter 830 may include the SPMI interface and the global counter 838.

Figure 10:
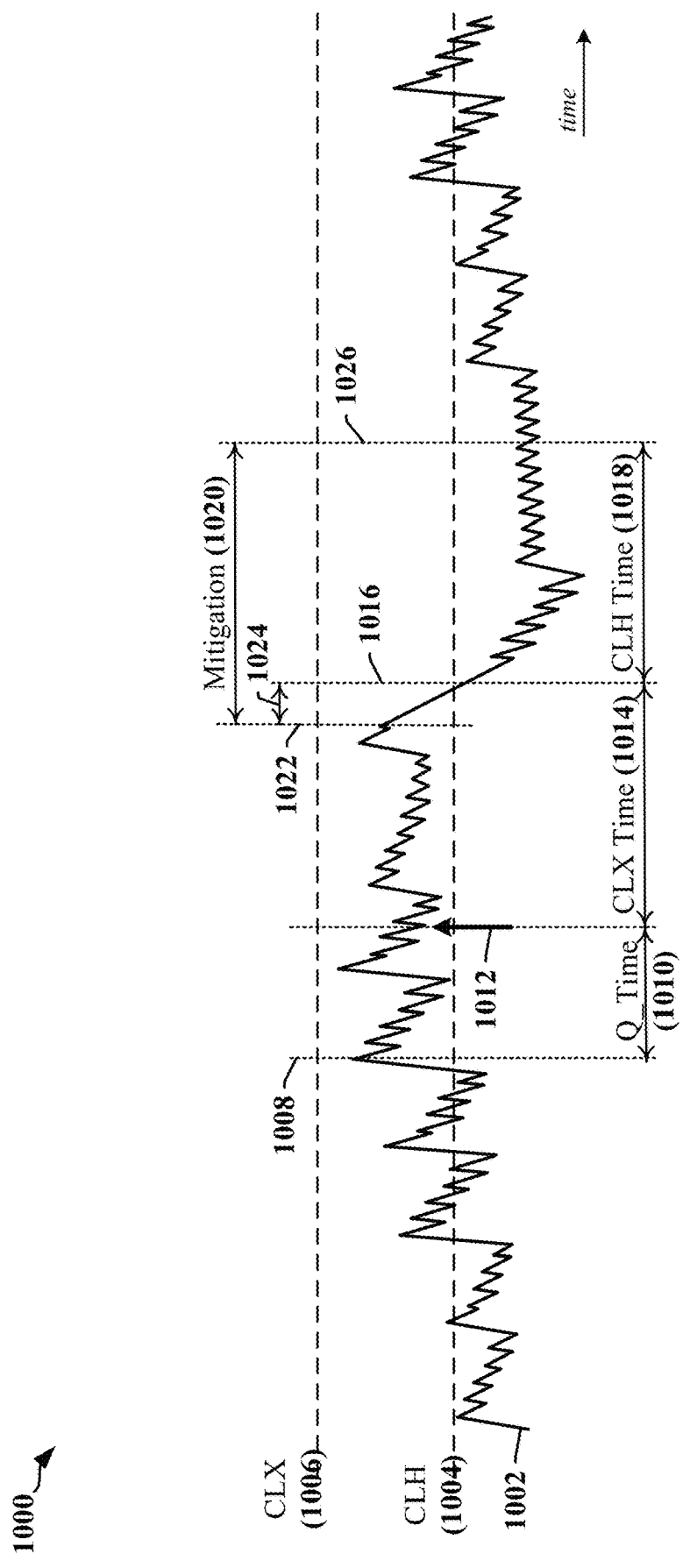
FIG. 10 is a timing diagram that illustrates current consumption associated with the systems of FIGS. 7 and 8 when current limit mitigation messages are transmitted.

FIG. 10 includes an example of power consumption 1000 associated with the system 700 or system 800. In the illustrated example, the system 700, 800 is initially operating below the CLH 1004 and CLX 1006, with current usage 1002 increasing over time. Current usage 1002 may peak above CLH 1004 for short periods of time without initiating mitigation timing due to the operation of qualification filters that filter out low-density excursions above CLH 1004. At time 1008, the current usage 1002 is determined to exceed CLH 1004 and a qualification time (Q_Time 1010) commences. The current usage 1002 remains above CLH 1004 and at time 1012 the current usage 1002 is deemed to enter CLX Time 1014. CLX Time 1014 is limited in duration and one of the PMIC regulators 704, $804_1$-$804_N$ may generate an interrupt that is transmitted in a telegram or message to the GPU 724, 824, the CPU 728, 828 or the NSP 726, 826 with a timestamp. The GPU 724, 824, the CPU 728, 828 or the NSP 726, 826 responds to the interrupt message by mitigating current usage 1002. Mitigation is initiated to ensure that current usage 1002 has dropped below CLH 1004 before the end 1016 of CLX Time 1014. The GPU 724, 824, the CPU 728, 828 or the NSP 726, 826 may determine the time elapsed since the interrupt was generated based on the received timestamp, and this elapsed time may enable mitigation to be commenced near the end of the CLX Time 1014. A mitigation period 1020 begins at time 1022. The duration of time 1024 between the time 1022 that mitigation commences and the end of the CLX Time 1014 may be optimized based on actual latency communicated in the CLX telegram, optimizing peak performance in the CLX Time 1014. The current usage 1002 is constrained to remain below CLH 1004 until the end 1026 of the mitigation period 1020.

Examples of Processing Circuits and Methods

Figure 11:
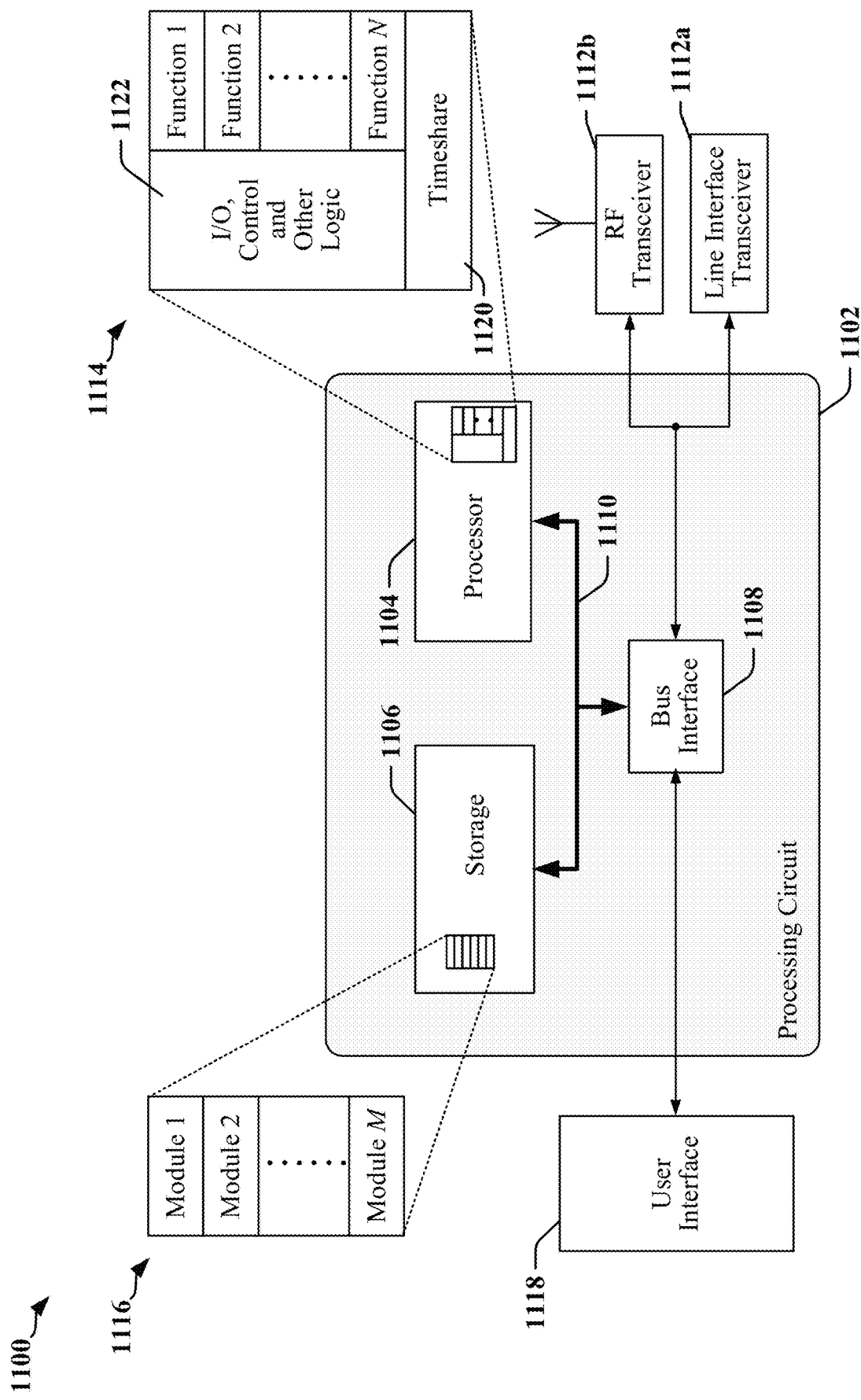
FIG. 11 illustrates one example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement certain methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104 and may manage access to external devices such as a transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
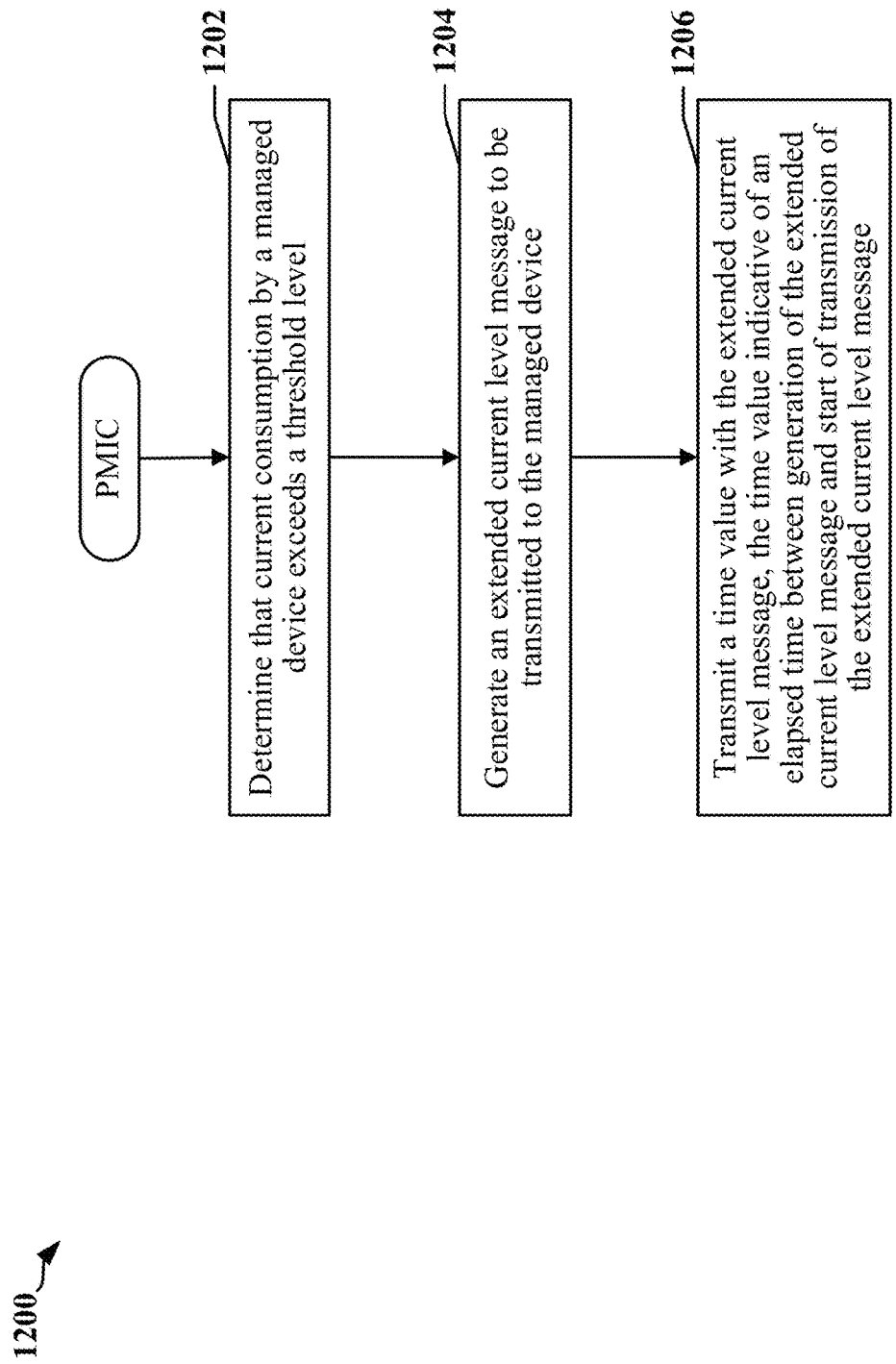
FIG. 12 is a flowchart that illustrates a method that may be performed by a slave device that is coupled to a serial bus in accordance with certain aspects disclosed herein.

FIG. 12 is a flowchart 1200 of a method of managing power at a PMIC coupled to a shared communication bus. The method may be performed by a finite state machine, sequencer or other processor, such as a general purpose processor or a processing circuit in the PMIC. In one example, the controller includes a finite state machine that can be configured to implement at least a portion of the method. In one example, the shared communication bus includes a serial bus that is operated in accordance with an SPMI protocol.

At block 1202, the controller may determine that current consumption by a managed device exceeds a threshold level. At block 1204, the controller may generate an extended current level message to be transmitted to the managed device. At block 1206, the controller may transmit a time value with the extended current level message. The time value may indicate an elapsed time between generation of the extended current level message and start of transmission of the extended current level message. The elapsed time may correspond to bus latency. In one example, the extended current level message is transmitted over a serial bus operated in accordance with SPMI protocols.

In some examples, the controller may use a counter to determine the elapsed time. The counter may be clocked by a clock signal synchronized to a clock signal generated by the managed device. The managed device may include a global counter. The counter may be clocked by a real time clock signal.

In some examples, the controller may capture a first snapshot of output of a counter when it is determined that the current consumption by a managed device exceeds threshold level, capture a second snapshot of the output of the counter when the extended current level message is being transmitted and provide, as the time value, the difference between the first snapshot of the output of the counter and the second snapshot of the output of the counter.

In some examples, the controller may capture a first snapshot of output of a counter when it is determined that the current consumption by a managed device exceeds threshold level, capture a second snapshot of the output of the counter upon winning a bus arbitration procedure conducted over the shared communication bus, and provide, as the time value, the difference between the first snapshot of the output of the counter and the second snapshot of the output of the counter.

In one example, determining that current consumption by the managed device exceeds the threshold level includes receiving an interrupt from one of a plurality of regulator circuits in the power management integrated circuit. Determining that current consumption by the managed device exceeds the threshold level may include receiving a message from one of a plurality of regulator circuits in the PMIC.

In one example, the threshold level corresponds to a maximum current limit. The managed device may be operating under a temporary extended current limit when current consumption by the managed device exceeds the threshold level.

Figure 13:
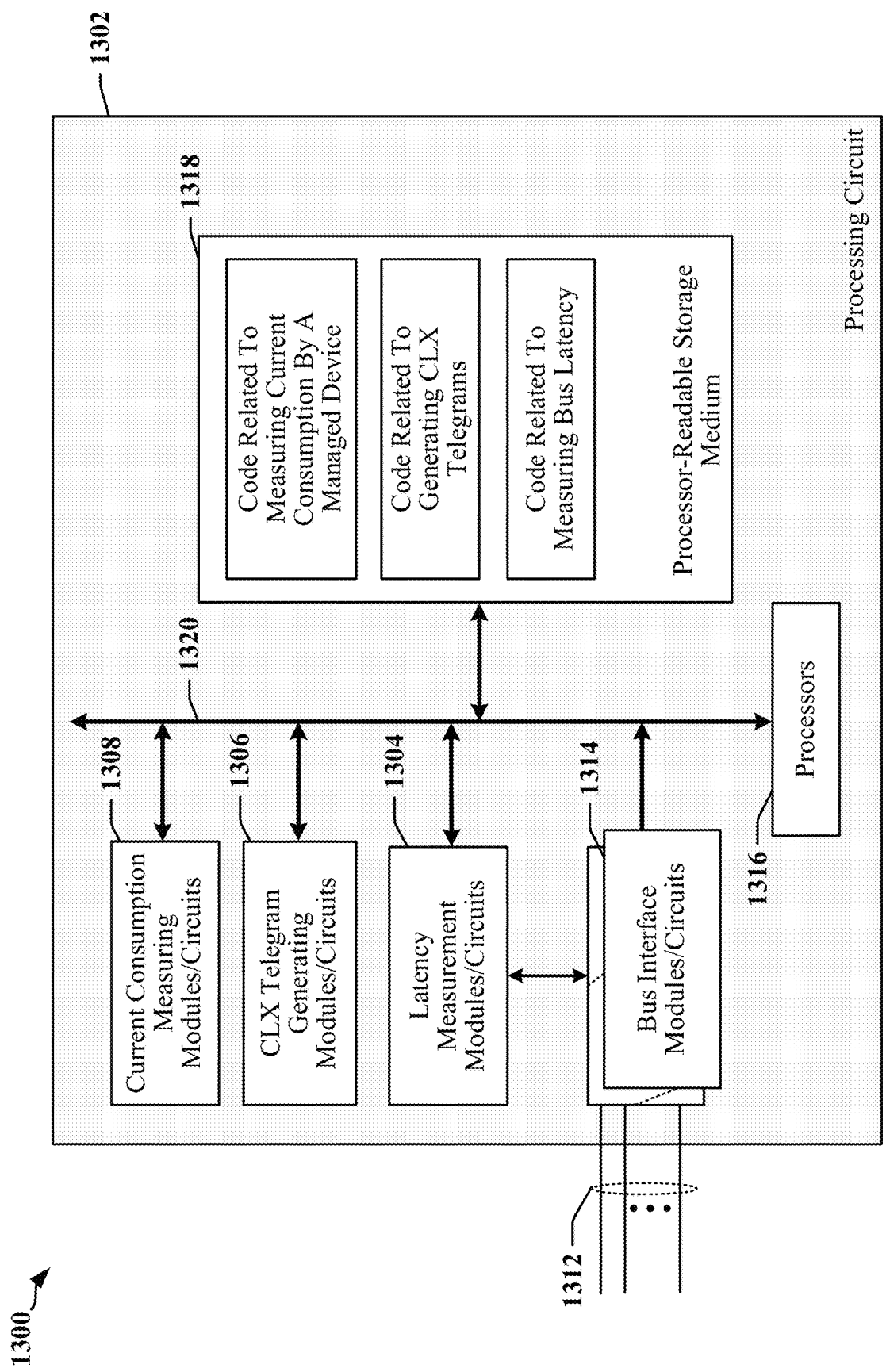
FIG. 13 illustrates a first example of a hardware implementation for an apparatus adapted in accordance with certain aspects disclosed herein.

FIG. 13 is a diagram illustrating an example of a hardware implementation for an apparatus 1300 employing a processing circuit 1302. The processing circuit typically has one or more microprocessors, microcontrollers, digital signal processors, sequencers and/or state machines, represented generally by the processors 1316. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors 1316, the modules or circuits 1304, 1306 and 1308 and the processor-readable storage medium 1318. One or more bus interface circuits and/or modules 1314 may be provided to support communications over multiple serial buses 1312. The bus 1320 may also link various other circuits such as timing sources, peripherals, voltage regulators, and power management circuits, which are well known in the art, and therefore, will not be described any further.

The processors 1316 may be responsible for general processing, including the execution of software, code and/or instructions stored on the processor-readable storage medium 1318. The processor-readable storage medium 1318 may include a non-transitory storage medium. The software, when executed by the processors 1316, causes the processing circuit 1302 to perform the various functions described herein for any particular apparatus. The processor-readable storage medium may be used for storing data that is manipulated by the processors 1316 when executing software. The processing circuit 1302 further includes at least one of the modules 1304, 1306 and 1308. The modules 1304, 1306 and 1308 may be software modules running in the processors 1316, resident/stored in the processor-readable storage medium 1318, one or more hardware modules coupled to the processors 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to monitor or measure current consumption by a managed device, modules and/or circuits 1306 adapted to generate CLX messages or telegrams and modules and/or circuits 1304 adapted to calculate bus latency associated with transmitting the CLX message or telegram. In various examples, the managed device may be a modem, application processor or a peripheral device.

In one example, the apparatus 1300 is configured to operate as a PMIC that has a first bus interface circuit and/or module 1314 configured to couple the apparatus 1300 to a shared communication bus, one or more regulator circuits configured to provide current to a managed device and a controller. The controller may be implemented using finite state machine, sequencer or general purpose processor. The controller may be configured to determine that current consumption by the managed device exceeds a threshold level, generate an extended current level message to be transmitted over the shared communication bus to the managed device and transmit a time value with the extended current level message. The time value may be indicative of an elapsed time between generation of the extended current level message and start of transmission of the extended current level message. In one example, the shared communication bus may be implemented as a serial bus that is operated in accordance with standards-based protocol such as an SPMI protocol.

The apparatus 1300 may include one or more counters configured to measure the elapsed time. One counter may be clocked by a clock signal synchronized to a clock signal generated by the managed device. In one example, the controller may be further configured to capture a first snapshot of output of the counter when it is determined that the current consumption by a managed device exceeds threshold level, capture a second snapshot of the output of the counter when the extended current level message is being transmitted and provide as the time value, the difference between the first snapshot of the output of the counter and the second snapshot of the output of the counter. In another example, the controller may be further configured to capture a first snapshot of output of a counter when it is determined that the current consumption by a managed device exceeds threshold level, capture a second snapshot of the output of the counter upon winning a bus arbitration procedure conducted over the serial bus, and provide as the time value, the difference between the first snapshot of the output of the counter and the second snapshot of the output of the counter. The controller may be configured to receive an interrupt from one of a plurality of regulator circuits in the power management integrated circuit. The interrupt may indicate that current consumption by the managed device exceeds the threshold level. The threshold level may correspond to a maximum current limit. The managed device may be operating under a temporary extended current limit when current consumption by the managed device exceeds the threshold level.

The processor-readable storage medium 1318 may include instructions that cause the processing circuit 1302 to determine that current consumption by a managed device exceeds a threshold level, generate an extended current level message to be transmitted to the managed device and transmit a time value with the extended current level message. The time value may be indicative of an elapsed time between generation of the extended current level message and start of transmission of the extended current level message.

The processor-readable storage medium 1318 may include instructions that cause the processing circuit 1302 to use a counter to determine the elapsed time. The counter may be clocked by a clock signal synchronized to a clock signal generated by the managed device. The processor-readable storage medium 1318 may include instructions that cause the processing circuit 1302 to capture a first snapshot of output of a counter when it is determined that the current consumption by a managed device exceeds threshold level, capture a second snapshot of the output of the counter when the extended current level message is being transmitted, and provide as the time value, the difference between the first snapshot of the output of the counter and the second snapshot of the output of the counter. In one example, the extended current level message may be transmitted over a serial bus operated in accordance with a standards-based protocol such as an SPMI protocol.

The processor-readable storage medium 1318 may include instructions that cause the processing circuit 1302 to capture a first snapshot of output of a counter when it is determined that the current consumption by a managed device exceeds threshold level, capture a second snapshot of the output of the counter upon winning a bus arbitration procedure conducted over the shared communication bus and provide as the time value, the difference between the first snapshot of the output of the counter and the second snapshot of the output of the counter.

The processor-readable storage medium 1318 may include instructions that cause the processing circuit 1302 to determine that current consumption by the managed device exceeds the threshold level by receiving an interrupt from one of a plurality of regulator circuits in the power management integrated circuit. The threshold level may correspond to a maximum current limit. The managed device may be operating under a temporary extended current limit when current consumption by the managed device exceeds the threshold level.

Figure 14:
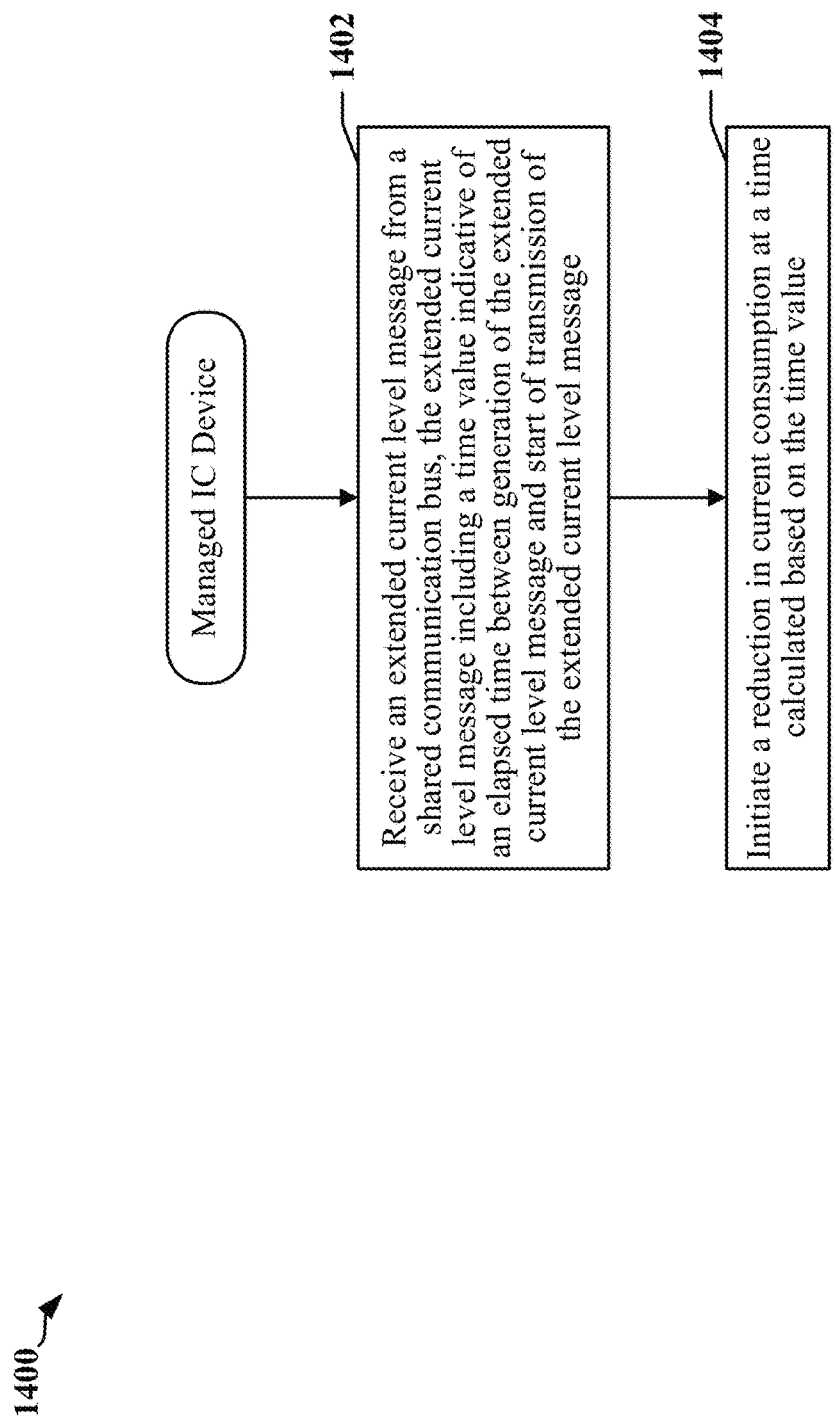
FIG. 14 is a flowchart that illustrates a method that may be performed by a bus master device that is coupled to a serial bus in accordance with certain aspects disclosed herein.

FIG. 14 is a flowchart 1400 of a method of managing power in an IC device. The method may be performed by a controller in the IC device. The controller may be implemented using a finite state machine, sequencer or other processor, such as a general purpose processor. In one example, the shared communication bus includes a serial bus that is operated in accordance with SPMI protocols.

At block 1402, the controller may receive an extended current level message from a shared communication bus, the extended current level message including a time value indicative of an elapsed time between generation of the extended current level message and start of transmission of the extended current level message. At block 1404, the controller may initiate a reduction in current consumption at a time calculated based on the time value.

In some examples, the controller may calculate the time at which the reduction in current consumption is initiated using a preconfigured extended current limit period reduced by the elapsed time. The extended current limit period may be defined by a specification or protocol governing operation of the IC device. The extended current limit period may be configured by an application. The extended current level message may be received from a PMIC. The time value may be expressed in periods of a global counter of the IC device. The counter may be synchronized with a counter in the PMIC. A current consumed by the integrated circuit device may be received from the PMIC.

Figure 15:
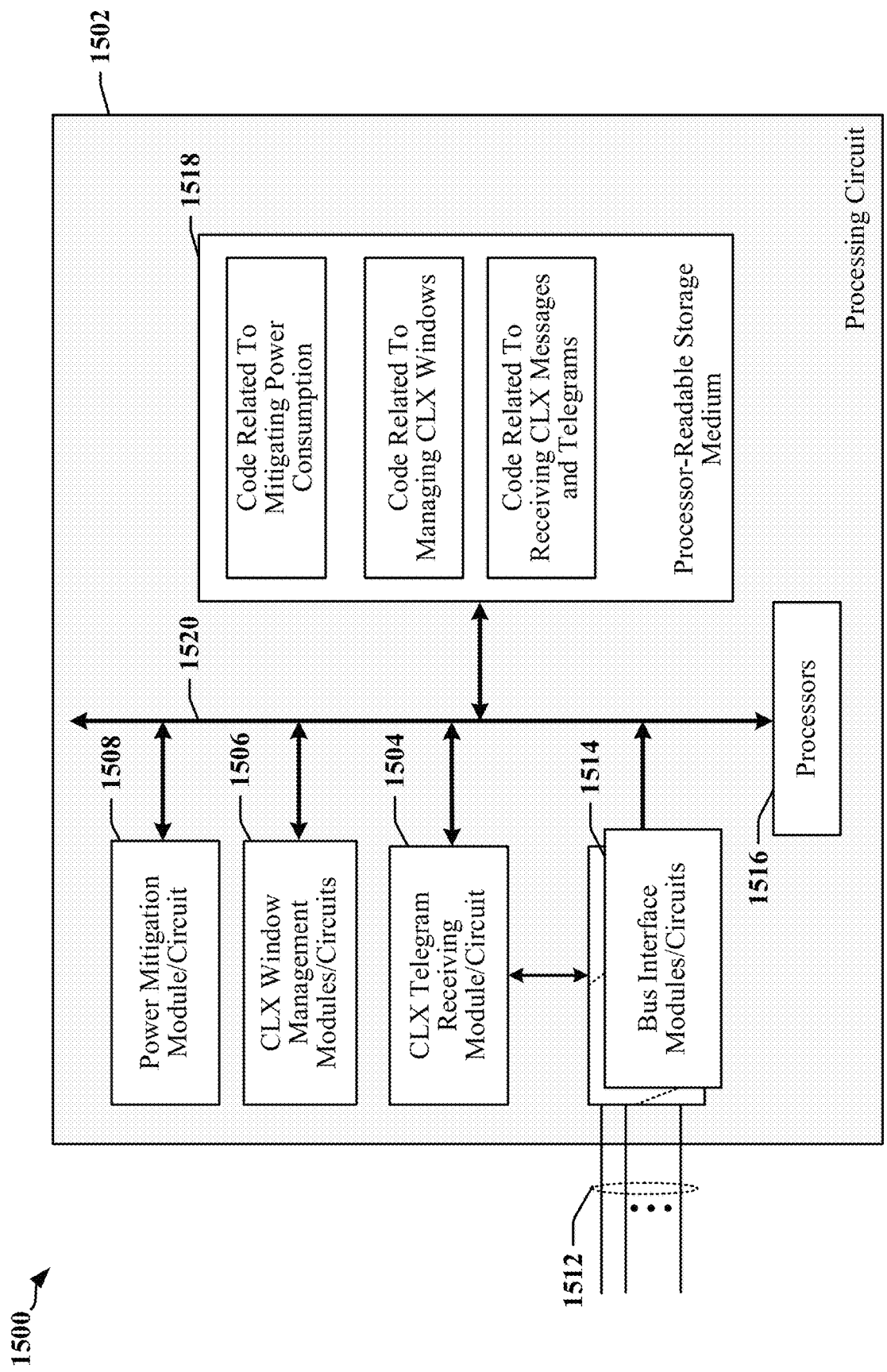
FIG. 15 illustrates a second example of a hardware implementation for an apparatus adapted in accordance with certain aspects disclosed herein.

FIG. 15 is a diagram illustrating a simplified example of a hardware implementation for an apparatus 1500 employing a processing circuit 1502. The processing circuit typically has one or more microprocessors, microcontrollers, digital signal processors, sequencers and/or state machines, represented generally by the processors 1516. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors 1516, the modules or circuits 1504, 1506 and 1508 and the processor-readable storage medium 1518. One or more bus interface circuits and/or modules 1514 may be provided to support communications over multiple serial buses 1512. The bus 1520 may also link various other circuits such as timing sources, peripherals, voltage regulators, and power management circuits, which are well known in the art, and therefore, will not be described any further.

The processors 1516 may be responsible for general processing, including the execution of software, code and/or instructions stored on the processor-readable storage medium 1518. The processor-readable storage medium 1518 may include a non-transitory storage medium. The software, when executed by the processors 1516, causes the processing circuit 1502 to perform the various functions described herein for any particular apparatus. The processor-readable storage medium may be used for storing data that is manipulated by the processors 1516 when executing software. The processing circuit 1502 further includes at least one of the modules 1504, 1506 and 1508. The modules 1504, 1506 and 1508 may be software modules running in the processors 1516, resident/stored in the processor-readable storage medium 1518, one or more hardware modules coupled to the processors 1516, or some combination thereof. The modules 1504, 1506 and 1508 may include microcontroller instructions, state machine configuration parameters, or some combination thereof.

In one configuration, the apparatus 1500 includes modules and/or circuits 1504 adapted to receive CLX telegrams or messages from a shared communication bus, modules and/or circuits 1506 adapted to manage a CLX window and modules and/or circuits 1508 adapted to implement and manage power mitigation.

In one example, the apparatus 1500 is implemented in an IC device has a bus interface circuit and/or module 1514 configured to couple the apparatus 1500 to the shared communication bus, and a controller or other processor. A controller may be implemented using a finite state machine. The controller may be configured to receive an extended current level message from the shared communication bus and initiate a reduction in current consumption at a time calculated based on the time value. The extended current level message may include a time value indicative of an elapsed time between generation of the extended current level message and start of transmission of the extended current level message.

The controller may be further configured to calculate the time at which the reduction in current consumption is initiated using a preconfigured extended current limit period reduced by the elapsed time. The extended current limit period may be defined by a specification or protocol governing operation of the apparatus 1500 or is configured by an application. The extended current level message may be received from a PMIC. The time value may be expressed in periods of a global counter of the apparatus 1500. The counter may be synchronized with a counter in the PMIC. A current consumed by the apparatus 1500 is received from the PMIC.

The processor-readable storage medium 1518 may include instructions that cause the processing circuit 1502 to receive an extended current level message from a shared communication bus and initiate a reduction in current consumption at a time calculated based on the time value. The extended current level message may include a time value indicative of an elapsed time between generation of the extended current level message and start of transmission of the extended current level message.

In some examples, the processor-readable storage medium 1518 may include instructions that cause the processing circuit 1502 to calculate the time at which the reduction in current consumption is initiated using a preconfigured extended current limit period reduced by the elapsed time. The extended current limit period may be defined by a specification or protocol governing operation of the IC device. The extended current limit period may be configured by an application. The extended current level message may be received from a PMIC. The time value may be expressed in periods of a global counter of the IC device. The counter may be synchronized with a counter in the PMIC. A current consumed by the integrated circuit device may be received from the PMIC.

Some implementation examples are described in the following numbered clauses:

1. A method of managing power at a power management integrated circuit, comprising: determining that current consumption by a managed device exceeds a threshold level; generating an extended current level message to be transmitted to the managed device; and transmitting a time value with the extended current level message, the time value indicative of an elapsed time between generation of the extended current level message and start of transmission of the extended current level message.
2. The method as described in clause 1, further comprising: using a counter to determine the elapsed time.
3. The method as described in clause 2, wherein the counter is clocked by a clock signal synchronized to a clock signal generated by the managed device.
4. The method as described in any of clauses 1-3, further comprising: capturing a first snapshot of output of a counter when it is determined that the current consumption by the managed device exceeds the threshold level; capturing a second snapshot of the output of the counter when the extended current level message is being transmitted; and provide as the time value, a difference between the first snapshot of the output of the counter and the second snapshot of the output of the counter.
5. The method as described in any of clauses 1-3, wherein the extended current level message is transmitted over a serial bus that is operated in accordance with a system power management interface (SPMI) protocol.
6. The method as described in clause 5, further comprising: capturing a first snapshot of output of a counter when it is determined that the current consumption by the managed device exceeds the threshold level; capturing a second snapshot of the output of the counter upon winning a bus arbitration procedure conducted over the serial bus; and providing as the time value, a difference between the first snapshot of the output of the counter and the second snapshot of the output of the counter.
7. The method as described in any of clauses 1-6, wherein determining that the current consumption by the managed device exceeds the threshold level comprises: receiving an interrupt from one of a plurality of regulator circuits in the power management integrated circuit.
8. The method as described in any of clauses 1-7, wherein the threshold level corresponds to a maximum current limit, and wherein the managed device is operating under a temporary extended current limit when the current consumption by the managed device exceeds the threshold level.
9. A power management integrated circuit comprising: a bus interface circuit configured to couple the power management integrated circuit to a shared communication bus; one or more regulator circuits configured to provide current to a managed device; and a controller configured to: determine that current consumption by the managed device exceeds a threshold level; generate an extended current level message to be transmitted over the shared communication bus to the managed device; and transmit a time value with the extended current level message, the time value indicative of an elapsed time between generation of the extended current level message and start of transmission of the extended current level message.
10. The power management integrated circuit as described in clause 9, further comprising: a counter configured to measure the elapsed time.
11. The power management integrated circuit as described in clause 10, wherein the counter is clocked by a clock signal synchronized to a clock signal generated by the managed device.
12. The power management integrated circuit as described in clause 10 or clause 11, wherein the controller is further configured to: capture a first snapshot of output of the counter when it is determined that the current consumption by the managed device exceeds the threshold level; capture a second snapshot of the output of the counter when the extended current level message is being transmitted; and provide as the time value, a difference between the first snapshot of the output of the counter and the second snapshot of the output of the counter.
13. The power management integrated circuit as described in clause 10 or clause 11, wherein the controller is further configured to: capture a first snapshot of output of the counter when it is determined that the current consumption by the managed device exceeds the threshold level; capture a second snapshot of the output of the counter upon winning a bus arbitration procedure conducted over the shared communication bus; and provide as the time value, a difference between the first snapshot of the output of the counter and the second snapshot of the output of the counter.

14. The power management integrated circuit as described in any of clauses 9-13, wherein the shared communication bus comprises a serial bus that is operated in accordance with a system power management interface (SPMI) protocol.

15. The power management integrated circuit as described in any of clauses 9-14, wherein the controller is further configured to: receive an interrupt from the one or more regulator, the interrupt indicating that the current consumption by the managed device exceeds the threshold level.

16. The power management integrated circuit as described in any of clauses 9-15, wherein the threshold level corresponds to a maximum current limit, and wherein the managed device is operating under a temporary extended current limit when the current consumption by the managed device exceeds the threshold level.

17. A method of managing power in an integrated circuit device, comprising: receiving an extended current level message from a shared communication bus, the extended current level message including a time value indicative of an elapsed time between generation of the extended current level message and start of transmission of the extended current level message; and initiating a reduction in current consumption at a time calculated based on the time value.

18. The method as described in clause 17, further comprising: calculating the time at which the reduction in the current consumption is initiated using a preconfigured extended current limit period reduced by the elapsed time.

19. The method as described in clause 18, wherein the extended current limit period is defined by a specification or protocol governing operation of the integrated circuit device.

20. The method as described in clause 18, wherein the extended current limit period is configured by an application.

21. The method as described in any of clauses 17-20, wherein the extended current level message is received from a power management integrated circuit.

22. The method as described in clause 21, wherein the time value is expressed in periods of a global counter of the integrated circuit device, and wherein the counter is synchronized with a counter in the power management integrated circuit.

23. The method as described in clause 21 or clause 22, wherein a current consumed by the integrated circuit device is received from the power management integrated circuit.

24. The method as described in any of clauses 17-23, wherein the shared communication bus comprises a serial bus that is operated in accordance with a system power management interface (SPMI) protocol.

25. An integrated circuit device comprising: a bus interface circuit configured to couple the integrated circuit device to a serial bus; and a controller configured to: receive an extended current level message from the serial bus, the extended current level message including a time value indicative of an elapsed time between generation of the extended current level message and start of transmission of the extended current level message; and initiate a reduction in current consumption at a time calculated based on the time value.

26. The integrated circuit device as described in clause 25, wherein the controller is further configured to: calculate the time at which the reduction in the current consumption is initiated using a preconfigured extended current limit period reduced by the elapsed time.

27. The integrated circuit device as described in clause 26, wherein the extended current limit period is defined by a specification or protocol governing operation of the integrated circuit device or is configured by an application.

28. The integrated circuit device as described in any of clauses 25-27, wherein the extended current level message is received from a power management integrated circuit.

29. The integrated circuit device as described in clause 28, wherein the time value is expressed in periods of a global counter of the integrated circuit device, and wherein the counter is synchronized with a counter in the power management integrated circuit.

30. The integrated circuit device as described in clause 28 or clause 29, wherein a current consumed by the integrated circuit device is received from the power management integrated circuit.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing power at a power management integrated circuit, comprising:
    determining that current consumption by a managed device exceeds a threshold level;
    generating an extended current level message to be transmitted to the managed device; and
    transmitting a time value with the extended current level message, the time value indicative of an elapsed time between generation of the extended current level message and start of transmission of the extended current level message.

2. The method of claim 1, further comprising:
    using a counter to determine the elapsed time.

3. The method of claim 2, wherein the counter is clocked by a clock signal synchronized to a clock signal generated by the managed device.

4. The method of claim 1, further comprising:
capturing a first snapshot of output of a counter when it is determined that the current consumption by the managed device exceeds the threshold level;
capturing a second snapshot of the output of the counter when the extended current level message is being transmitted; and
provide as the time value, a difference between the first snapshot of the output of the counter and the second snapshot of the output of the counter.

5. The method of claim 1, wherein the extended current level message is transmitted over a serial bus that is operated in accordance with a system power management interface (SPMI) protocol.

6. The method of claim 5, further comprising:
capturing a first snapshot of output of a counter when it is determined that the current consumption by the managed device exceeds the threshold level;
capturing a second snapshot of the output of the counter upon winning a bus arbitration procedure conducted over the serial bus; and
providing as the time value, a difference between the first snapshot of the output of the counter and the second snapshot of the output of the counter.

7. The method of claim 1, wherein determining that the current consumption by the managed device exceeds the threshold level comprises:
receiving an interrupt from one of a plurality of regulator circuits in the power management integrated circuit.

8. The method of claim 1, wherein the threshold level corresponds to a maximum current limit, and wherein the managed device is operating under a temporary extended current limit when the current consumption by the managed device exceeds the threshold level.

9. A power management integrated circuit comprising:
a bus interface circuit configured to couple the power management integrated circuit to a shared communication bus;
one or more regulator circuits configured to provide current to a managed device; and
a controller configured to:
determine that current consumption by the managed device exceeds a threshold level;
generate an extended current level message to be transmitted over the shared communication bus to the managed device; and
transmit a time value with the extended current level message, the time value indicative of an elapsed time between generation of the extended current level message and start of transmission of the extended current level message.

10. The power management integrated circuit of claim 9, further comprising:
a counter configured to measure the elapsed time.

11. The power management integrated circuit of claim 10, wherein the counter is clocked by a clock signal synchronized to a clock signal generated by the managed device.

12. The power management integrated circuit of claim 10, wherein the controller is further configured to:
capture a first snapshot of output of the counter when it is determined that the current consumption by the managed device exceeds the threshold level;
capture a second snapshot of the output of the counter when the extended current level message is being transmitted; and
provide as the time value, a difference between the first snapshot of the output of the counter and the second snapshot of the output of the counter.

13. The power management integrated circuit of claim 10, wherein the controller is further configured to:
capture a first snapshot of output of the counter when it is determined that the current consumption by the managed device exceeds the threshold level;
capture a second snapshot of the output of the counter upon winning a bus arbitration procedure conducted over the shared communication bus; and
provide as the time value, a difference between the first snapshot of the output of the counter and the second snapshot of the output of the counter.

14. The power management integrated circuit of claim 9, wherein the shared communication bus comprises a serial bus that is operated in accordance with a system power management interface (SPMI) protocol.

15. The power management integrated circuit of claim 9, wherein the controller is further configured to:
receive an interrupt from the one or more regulator circuits, the interrupt indicating that the current consumption by the managed device exceeds the threshold level.

16. The power management integrated circuit of claim 9, wherein the threshold level corresponds to a maximum current limit, and wherein the managed device is operating under a temporary extended current limit when the current consumption by the managed device exceeds the threshold level.

17. A method of managing power in an integrated circuit device, comprising:
receiving an extended current level message from a shared communication bus, the extended current level message including a time value indicative of an elapsed time between generation of the extended current level message and start of transmission of the extended current level message; and
initiating a reduction in current consumption at a time calculated based on the time value.

18. The method of claim 17, further comprising:
calculating the time at which the reduction in the current consumption is initiated using a preconfigured extended current limit period reduced by the elapsed time.

19. The method of claim 18, wherein the extended current limit period is defined by a specification or protocol governing operation of the integrated circuit device.

20. The method of claim 18, wherein the extended current limit period is configured by an application.

21. The method of claim 17, wherein the extended current level message is received from a power management integrated circuit.

22. The method of claim 21, wherein the time value is expressed in periods of a global counter of the integrated circuit device, and wherein the counter is synchronized with a counter in the power management integrated circuit.

23. The method of claim 21, wherein a current consumed by the integrated circuit device is received from the power management integrated circuit.

24. The method of claim 17, wherein the shared communication bus comprises a serial bus that is operated in accordance with a system power management interface (SPMI) protocol.

25. An integrated circuit device comprising:
a bus interface circuit configured to couple the integrated circuit device to a serial bus; and
a controller configured to:
receive an extended current level message from the serial bus, the extended current level message including a time value indicative of an elapsed time between generation of the extended current level message and start of transmission of the extended current level message; and
initiate a reduction in current consumption at a time calculated based on the time value.

26. The integrated circuit device of claim 25, wherein the controller is further configured to:
calculate the time at which the reduction in the current consumption is initiated using a preconfigured extended current limit period reduced by the elapsed time.

27. The integrated circuit device of claim 26, wherein the extended current limit period is defined by a specification or protocol governing operation of the integrated circuit device or is configured by an application.

28. The integrated circuit device of claim 25, wherein the extended current level message is received from a power management integrated circuit.

29. The integrated circuit device of claim 28, wherein the time value is expressed in periods of a global counter of the integrated circuit device, and wherein the counter is synchronized with a counter in the power management integrated circuit.

30. The integrated circuit device of claim 28, wherein a current consumed by the integrated circuit device is received from the power management integrated circuit.

* * * * *